(12) United States Patent
Shiratani et al.

(10) Patent No.: US 12,116,751 B2
(45) Date of Patent: Oct. 15, 2024

(54) SHOVEL

(71) Applicant: SUMITOMO CONSTRUCTION MACHINERY CO., LTD., Tokyo (JP)

(72) Inventors: Ryuji Shiratani, Chiba (JP); Tomoki Kurokawa, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 386 days.

(21) Appl. No.: 17/448,910

(22) Filed: Sep. 27, 2021

(65) Prior Publication Data

US 2022/0010522 A1    Jan. 13, 2022

Related U.S. Application Data

(63) Continuation of application No. PCT/JP2020/014205, filed on Mar. 27, 2020.

(30) Foreign Application Priority Data

Mar. 29, 2019 (JP) ................. 2019-066681

(51) Int. Cl.
| | |
|---|---|
| *E02F 3/43* | (2006.01) |
| *B60Q 9/00* | (2006.01) |
| *E02F 3/32* | (2006.01) |
| *E02F 9/22* | (2006.01) |
| *E02F 9/26* | (2006.01) |

(52) U.S. Cl.
CPC ............... *E02F 3/439* (2013.01); *B60Q 9/00* (2013.01); *E02F 3/32* (2013.01); *E02F 9/262* (2013.01); *E02F 9/2235* (2013.01); *E02F 9/2285* (2013.01); *E02F 9/2292* (2013.01); *E02F 9/2296* (2013.01)

(58) Field of Classification Search
CPC ............................................. B65G 2201/045
See application file for complete search history.

(56) References Cited

U.S. PATENT DOCUMENTS

| | | | |
|---|---|---|---|
| 6,076,029 A | 6/2000 | Watanabe et al. | |
| 2007/0010925 A1 | 1/2007 | Yokoyama et al. | |
| 2009/0202109 A1* | 8/2009 | Clar ..................... | E02F 9/261 |
| | | | 382/104 |

(Continued)

FOREIGN PATENT DOCUMENTS

| | | |
|---|---|---|
| JP | S60-208524 | 10/1985 |
| JP | H06-057781 | 3/1994 |

(Continued)

OTHER PUBLICATIONS

International Search Report for PCT/JP2020/014205 mailed on Jun. 30, 2020.

*Primary Examiner* — Jaime Figueroa
*Assistant Examiner* — Jerrod Irvin Davis
(74) *Attorney, Agent, or Firm* — IPUSA, PLLC

(57) ABSTRACT

A shovel includes a lower traveling body, an upper turning body turnably mounted on the lower traveling body, an attachment attached to the upper turning body, an attachment actuator configured to move the attachment, and processing circuitry configured to assist an operator so that a level difference between two adjacent finished surfaces becomes equal to or less than a predetermined value.

14 Claims, 20 Drawing Sheets

(56) References Cited

U.S. PATENT DOCUMENTS

| | | | | |
|---|---|---|---|---|
| 2014/0288771 A1* | 9/2014 | Li | .......................... | H04N 7/185 |
| | | | | 701/34.4 |
| 2016/0265186 A1 | 9/2016 | Kami et al. | | |
| 2018/0003856 A1* | 1/2018 | Hukkeri | ................ | G01S 15/931 |
| 2022/0049453 A1* | 2/2022 | Izumi | ..................... | E02F 9/262 |

FOREIGN PATENT DOCUMENTS

| | | | | |
|---|---|---|---|---|
| JP | 2001-067126 | 3/2001 | | |
| JP | 2013-217137 | 10/2013 | | |
| WO | 1998/036131 | 8/1998 | | |
| WO | 2005/024144 | 3/2005 | | |
| WO | WO-2019189939 A1 * | 10/2019 | .............. | E02F 3/435 |

* cited by examiner

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2020/014205, filed on Mar. 27, 2020, and designating the U.S., which claims priority to Japanese Patent Application No. 2019-066681 filed on Mar. 29, 2019. The entirety of the foregoing applications are incorporated herein by reference.

BACKGROUND

Technical Field

The present disclosure relates to a shovel.

Description of Related Art

Conventionally, a shovel that assists a sloped surface finishing task is known.

SUMMARY

An aspect of an embodiment of the present invention provides a shovel that includes a lower traveling body, an upper turning body turnably mounted on the lower traveling body, an attachment attached to the upper turning body, an attachment actuator configured to move the attachment, and processing circuitry configured to assist an operator so that a level difference between two adjacent finished surfaces becomes equal to or less than a predetermined value.

EMBODIMENT OF THE INVENTION

Conventionally, a shovel that assists a sloped surface finishing task is known. This shovel excavates a slope by moving the teeth end of the bucket along a designed surface while automatically adjusting the position of the teeth end of the bucket, so that a sloped surface is formed. Specifically, during a sloped surface finishing task for moving the teeth end of the bucket from the bottom edge (the bottom of the sloped surface) to the top edge (the top of the sloped surface) of the slope, the sloped surface is formed by automatically adjusting the position of the teeth end of the bucket so that the teeth end of the bucket moves along the slope.

However, the shovel described above has a risk of causing a relatively large level difference between two adjacent strip-shaped areas formed by repeatedly performing excavation movements, because of an error in the output of the GNSS antenna caused by satellite positions or weather, an error in the output of the IMU, an error related to the discharge amount of a hydraulic pump due to the hydraulic oil temperature or the temperature of a hydraulic actuator, an error related to the amount of extension and retraction of a hydraulic cylinder, or the like. The strip-shaped area is the portion of a finished surface having a width corresponding to the width of the bucket.

Accordingly, it is desired to provide a shovel capable of reducing the level difference between two adjacent strip-shaped areas.

Figure 1:
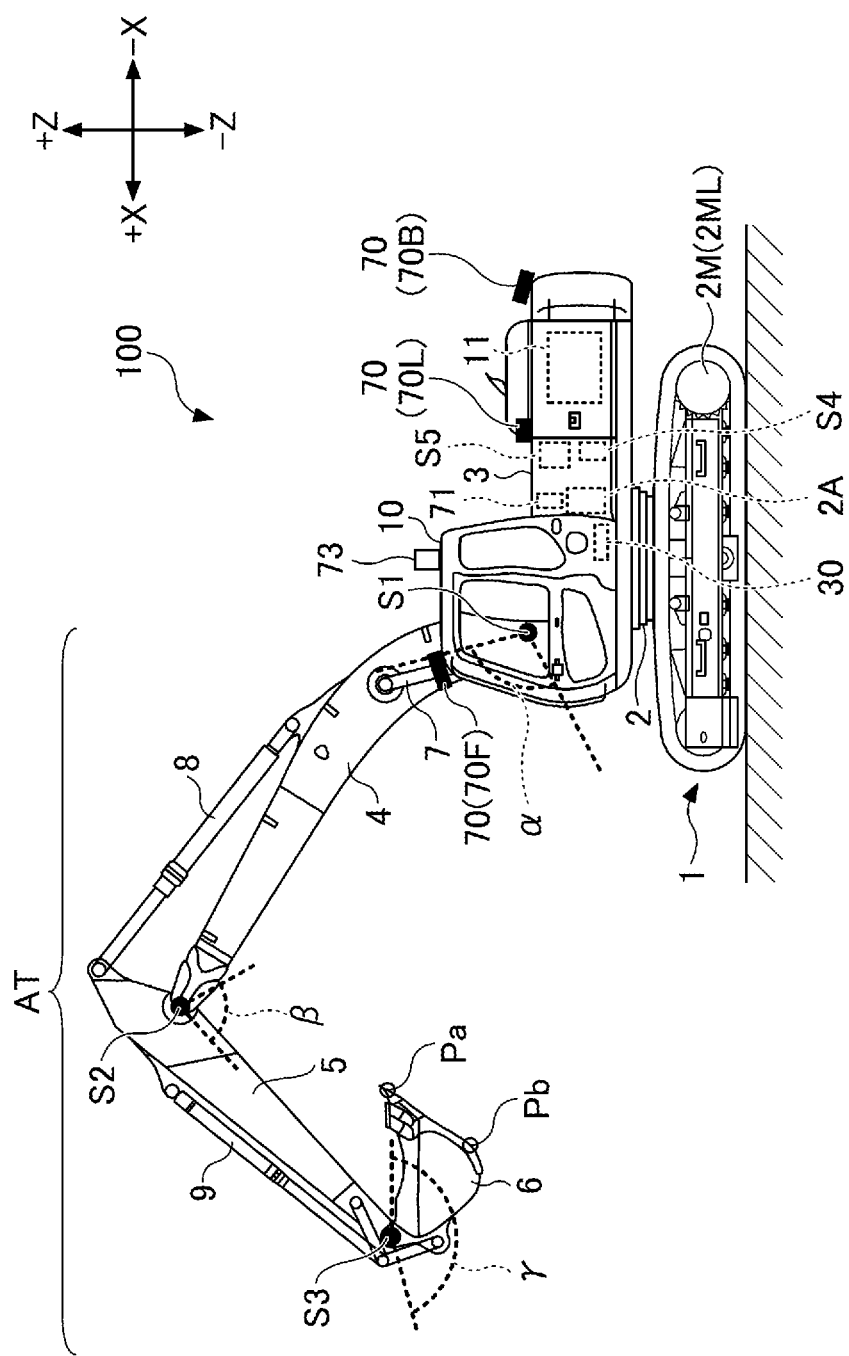
FIG. 1 is a side view of a shovel according to an embodiment of the present invention.
Figure 2:
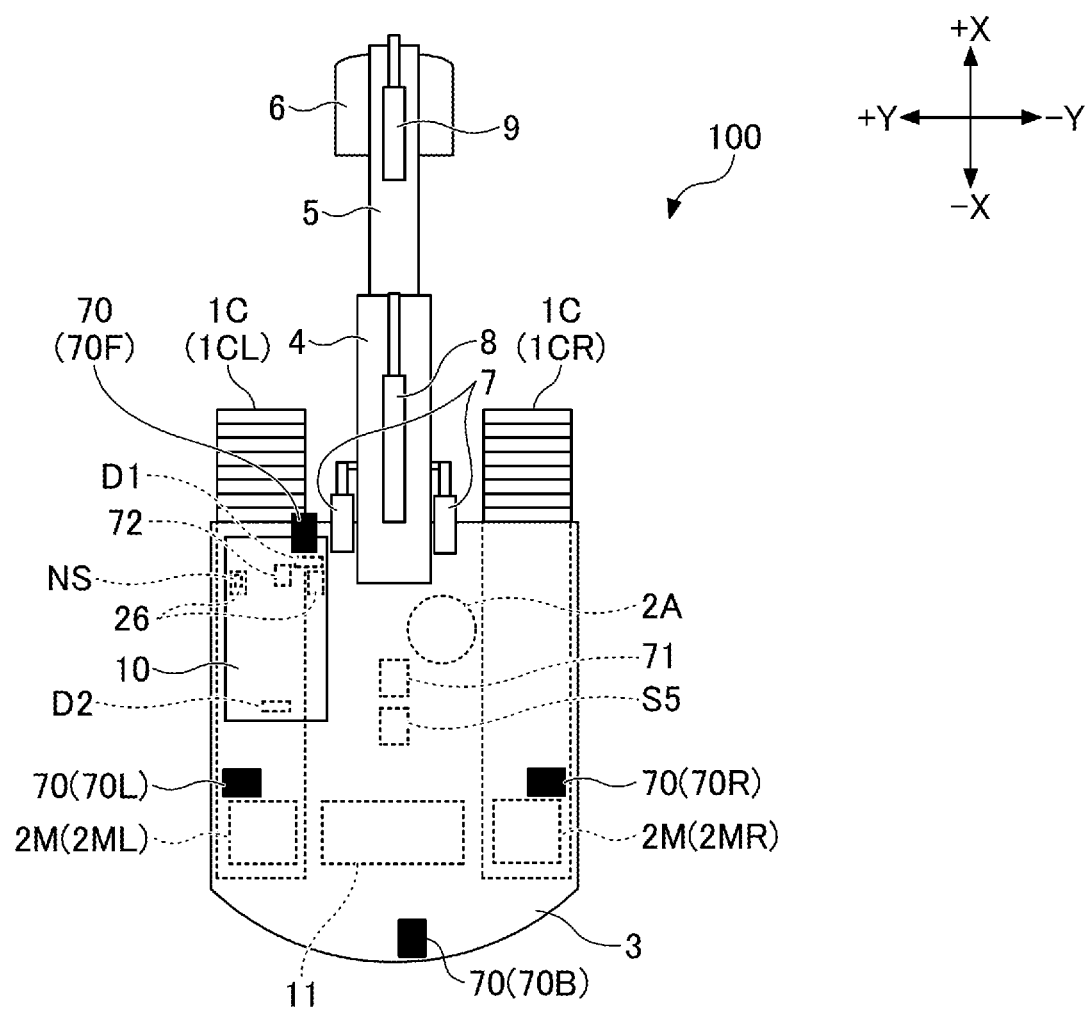
FIG. 2 is a top view of the shovel of FIG. 1.

First, a shovel 100 serving as a shovel according to an embodiment of the present invention is described with reference to FIG. 1 and FIG. 2. FIG. 1 is a side view of the shovel 100. FIG. 2 is a top view of the shovel 100.

In the present embodiment, a lower traveling body 1 of the shovel 100 includes a crawler 1C. The crawler 1C is driven by a traveling hydraulic motor 2M, serving as a traveling actuator, provided in the lower traveling body 1. Specifically, the crawler 1C includes a left crawler 1CL and a right crawler 1CR. The left crawler 1CL is driven by a left traveling hydraulic motor 2ML, and the right crawler 1CR is driven by a right traveling hydraulic motor 2MR.

An upper turning body 3 is pivotably provided on the lower traveling body 1 via a turning mechanism 2. The turning mechanism 2 is driven by a turning hydraulic motor 2A, serving as a turning actuator, provided in the upper turning body 3. However, the turning actuator may be a turning electric generator as an electric actuator.

A boom 4 is provided on the upper turning body 3. An arm 5 is attached to a tip of the boom 4, and a bucket 6 is attached to the tip of the arm 5 as an end attachment. The boom 4, the arm 5, and the bucket 6 constitute an excavation attachment AT, which is one example of an attachment. The boom 4 is driven by a boom cylinder 7, the arm 5 is driven by an arm cylinder 8, and the bucket 6 is driven by a bucket cylinder 9. The boom cylinder 7, the arm cylinder 8, and the bucket cylinder 9 constitute an attachment actuator. The end attachment may be a sloped surface bucket.

The boom 4 is rotatably supported up and down with respect to the upper turning body 3. A boom angle sensor S1 is provided on the boom 4. The boom angle sensor S1 can detect the boom angle α, which is the rotation angle of the boom 4. The boom angle α is the elevation angle from the state where the boom 4 is most lowered. Therefore, the boom angle α is maximized when the boom 4 is most raised.

The arm 5 is supported pivotally relative to the boom 4. Then, an arm angle sensor S2 is provided on the arm 5. The arm angle sensor S2 can detect the arm angle R, which is the rotation angle of the arm 5. The arm angle R may be the extending angle from the most closed position of the arm 5. Therefore, the arm angle β is maximized when the arm 5 is most opened.

The bucket 6 is rotatably supported relative to the arm 5. A bucket angle sensor S3 is provided on the bucket 6. The bucket angle sensor S3 can detect the bucket angle γ, which is the rotation angle of the bucket 6. The bucket angle γ is the extending angle from the most closed position of the bucket 6. Therefore, the bucket angle γ is maximized when the bucket 6 is opened most.

In the embodiment shown in FIG. 1, each of the boom angle sensor S1, the arm angle sensor S2, and the bucket angle sensor S3 includes a combination of an acceleration sensor and a gyro sensor. However, it may include only the acceleration sensor. Also, the boom angle sensor S1 may be a stroke sensor, a rotary encoder, a potentiometer, an inertia measuring device, or the like provided on the boom cylinder 7. The same applies to the arm angle sensor S2 and the bucket angle sensor S3.

A cab 10 is provided in the upper turning body 3 as an operator's cab, and a power source such as an engine 11 is provided in the upper turning body 3. Further, a spatial recognition device 70, a direction detection device 71, a positioning device 73, a body inclination sensor S4, a turning angular velocity sensor S5, and the like are provided in the upper turning body 3. An operation apparatus 26, a controller 30, an information input device 72, a display device D1, and an audio output device D2 and the like are provided inside the cab 10. For convenience, it is assumed in a side of the upper turning body 3 attached with the excavation attachment AT is referred to as the front side and a side of the upper turning body 3 attached with the counterweight is referred to as the rear side.

The spatial recognition device 70 is configured to recognize an object that is present in a three-dimensional space around the shovel 100. For example, the object is an excavation target surface, a person, an animal, a vehicle (a dump truck and the like), work equipment, construction machinery, a building, an electric wire, a fence, a hole, or the like. In a case where the spatial recognition device 70 is configured to detect a person as an object, the spatial recognition device 70 is configured to distinguish a person from objects other than a person. Further, the spatial recognition device 70 may be configured to distinguish the type of an object from a person on the basis of a work vest or a helmet worn by a person.

Also, the spatial recognition device 70 may be configured to recognize the terrain. Specifically, for example, the spatial recognition device 70 may be configured to calculate the difference between the current terrain and the designed surface. The difference between the current terrain and the designed surface is, for example, a distance between the surface of the current terrain and the designed surface in a direction perpendicular to the designed surface.

Also, the spatial recognition device 70 may be configured to calculate the distance from the spatial recognition device 70 or the shovel 100 to the recognized object. The spatial recognition device 70 includes, for example, an ultrasonic sensor, a millimeter wave radar, a monocular camera, a stereo camera, a LIDAR device, a distance image sensor, an infrared sensor, or the like, or a combination thereof. In the present embodiment, the spatial recognition device 70 includes a front sensor 70F provided on the front end of the top surface of the cab 10, a rear sensor 70B provided on the rear end of the top surface of the upper turning body 3, a left sensor 70L provided on the left end of the top surface of the upper turning body 3, and a right sensor 70R provided on the right end of the top surface of the upper turning body 3. An upward sensor for recognizing an object that is present in the space above the upper turning body 3 may be attached to the shovel 100.

The direction detection device 71 is configured to detect information about the relative relationship between the direction of the upper turning body 3 and the direction of the lower traveling body 1. For example, the direction detection device 71 may be constituted by a combination of a geomagnetic sensor attached to the lower traveling body 1 and a geomagnetic sensor attached to the upper turning body 3. Alternatively, the direction detection device 71 may be constituted by a combination of a GNSS receiver attached to the lower traveling body 1 and a GNSS receiver attached to the upper turning body 3. The direction detection device 71 may be a rotary encoder, a rotary position sensor, or any combination thereof. In a configuration in which the upper turning body 3 is driven by a turning electric generator, the direction detection device 71 may be constituted by a resolver. For example, the direction detection device 71 may be attached to a center joint provided in connection with the turning mechanism 2 that achieves relative rotation between the lower traveling body 1 and the upper turning body 3.

The direction detection device 71 may be constituted by a camera attached to the upper turning body 3. In this case, the direction detection device 71 applies conventional image processing to an image (an input image) captured by the camera attached to the upper turning body 3 to detect the image of the lower traveling body 1 included in the input image. Also, the direction detection device 71 identifies the longitudinal direction of the lower traveling body 1 by detecting the image of the lower traveling body 1 using a conventional image recognition technique. Also, the direction detection device 71 derives the angle formed between the direction of the anteroposterior axis of the upper turning body 3 and the longitudinal direction of the lower traveling body 1. The direction of the forward-and-backward axis of the upper turning body 3 is derived from the attachment position of the camera. In particular, because the crawler 1C protrudes from the upper turning body 3, the direction detection device 71 can identify the longitudinal direction of the lower traveling body 1 by detecting the image of the crawler 1C. In this case, the direction detection device 71 may be integrated with the controller 30. Further, the camera may be the spatial recognition device 70.

The information input device 72 is configured to allow the shovel operator to input information to controller 30. In the present embodiment, the information input device 72 is a switch panel provided in proximity to the display unit of display device D1. However, the information input device 72 may be a touch panel provided in the display unit of the display device D1, or may be an audio input device such as a microphone provided in the cab 10. Also, The information input device 72 may be a communication device that obtains information from the outside.

The positioning device 73 is configured to determine the position of the upper turning body 3. In the present embodiment, the positioning device 73 is a GNSS receiver that detects the position of the upper turning body 3 and outputs the detected value to the controller 30. The positioning device 73 may be a GNSS compass. In this case, because the positioning device 73 can detect the position and the direction of the upper turning body 3, the positioning device 73 also functions as the direction detection device 71.

The body inclination sensor S4 detects the inclination of the upper turning body 3 with respect to a predetermined plane. In the present embodiment, the body inclination sensor S4 is an acceleration sensor that detects the inclination angle around the forward-and-backward axis and around the left-and-right axis of the upper turning body 3 with respect to the horizontal plane. The forward-and-backward axis and the left-and-right axis of the upper turning body 3 are orthogonal to each other and pass through the shovel center point, which is one point on the turning axis of shovel 100.

The turning angular velocity sensor S5 detects the angular velocity of the upper turning body 3 when turning. In the present embodiment, the turning angular velocity sensor S5 is a gyro sensor. The turning angular velocity sensor S5 may be a resolver, a rotary encoder, or any combination thereof. The turning angular velocity sensor S5 may detect the turning velocity. The turning velocity may be calculated from the turning angular velocity.

Hereinafter, at least one of the boom angle sensor S1, the arm angle sensor S2, the bucket angle sensor S3, the body inclination sensor S4, and the turning angular velocity sensor S5 is also referred to as an orientation detection device. For example, the orientation of the excavation attachment AT is detected on the basis of the output of each of the boom angle sensor S1, the arm angle sensor S2, and the bucket angle sensor S3.

The display device D1 is a device that displays information. In the present embodiment, the display device D1 is a liquid crystal display provided in the cab 10. However, the display device D1 may be a display of a mobile terminal such as a smartphone.

The audio output device D2 is a device that outputs audio. The audio output device D2 includes at least one device that outputs audio to the operator inside the cab 10 and, and a device that outputs audio to workers outside the cab 10. The audio output device D2 may be a speaker of a mobile terminal.

The operation apparatus 26 is a device used by the operator to operate the actuator. For example, the operation apparatus 26 includes, an operation lever and an operation pedal. The actuator includes at least one of a hydraulic actuator and an electric actuator.

The controller 30 is a control device for controlling the shovel 100. In the present embodiment, the controller 30 is provided with a computer including a CPU, a volatile storage device, a non-volatile storage device, and the like. The controller 30 reads programs corresponding to respective functions from the non-volatile storage device and loads the programs into the volatile storage device to cause the CPU to perform operations corresponding to the respective functions. For example, the functions may include a machine guidance function for guiding manual operations of the shovel 100 by the operator and a machine control function for supporting the manual operations of the shovel 100 by the operator or causing the shovel 100 to automatically or autonomously operate. The controller 30 may include a contact avoidance function that causes the shovel 100 to automatically or autonomously operate or stops the shovel 100 in order to avoid contact between the shovel 100 and an object around the shovel 100. The controller 30 is an example of processing circuitry.

For example, before the actuator operates, if it is determined that a person is present within a predetermined range (within a monitored range) from the shovel 100 based on the information obtained by the spatial recognition device 70, even if the operator operates the operation apparatus 26, the controller 30 may limit the actuator's motion to be inoperable or to be a slow operation. Specifically, the controller 30 may disable the motion of the actuator by locking the gate lock valve if it is determined that a person is present within the monitored range. In the case where the operation apparatus 26 is of an electric type, the motion of the actuator can be disabled by disabling the control command to the operation control valve. The same applies to other types of the operation apparatus 26 when a pilot pressure corresponding to a control command is output from the controller 30 and an operation control valve is used to apply the pilot pressure to a pilot port of a corresponding control valve in a control valve unit 17 (for example, one of control valves 171 to 176). When operating the actuator at a slow speed is desired, the control command from the controller 30 to the operation control valve can be limited to contents corresponding to a relatively low pilot pressure, thereby allowing the actuator to operate at a slow speed. Thus, if it is determined that the object targeted for monitoring is within the monitored range, the actuator is not driven even if the operation apparatus 26 is operated, or is driven at an operation speed (slow speed) that is less than the operation speed corresponding to the operation input to the operation apparatus 26. Further, the actuator operation may be stopped or decelerated regardless of the operator's operation if it is determined that a person is present within the monitored range while the operator is operating the operation apparatus 26. Specifically, if it is determined that a person is within the monitored range, the controller 30 may stop the actuator by locking the gate lock valve. When pilot pressure corresponding to a control command from the controller 30 is output, and an operation control valve is used to apply the pilot pressure to a pilot port of a corresponding control valve in the control valve unit, the motion of the actuator may be disabled or limited to a decelerated motion by disabling the control command from the controller 30 to the operation control valve (or by outputting a deceleration command to the operation control valve. Also, if the detected object targeted for monitoring is a dump truck, control of the stopping or decelerating the actuator may or may not be performed. For example, the actuator may be controlled to avoid the detected dump truck. In this manner, the type of object detected may be recognized and the actuator may be controlled based on that recognition.

Figure 3:
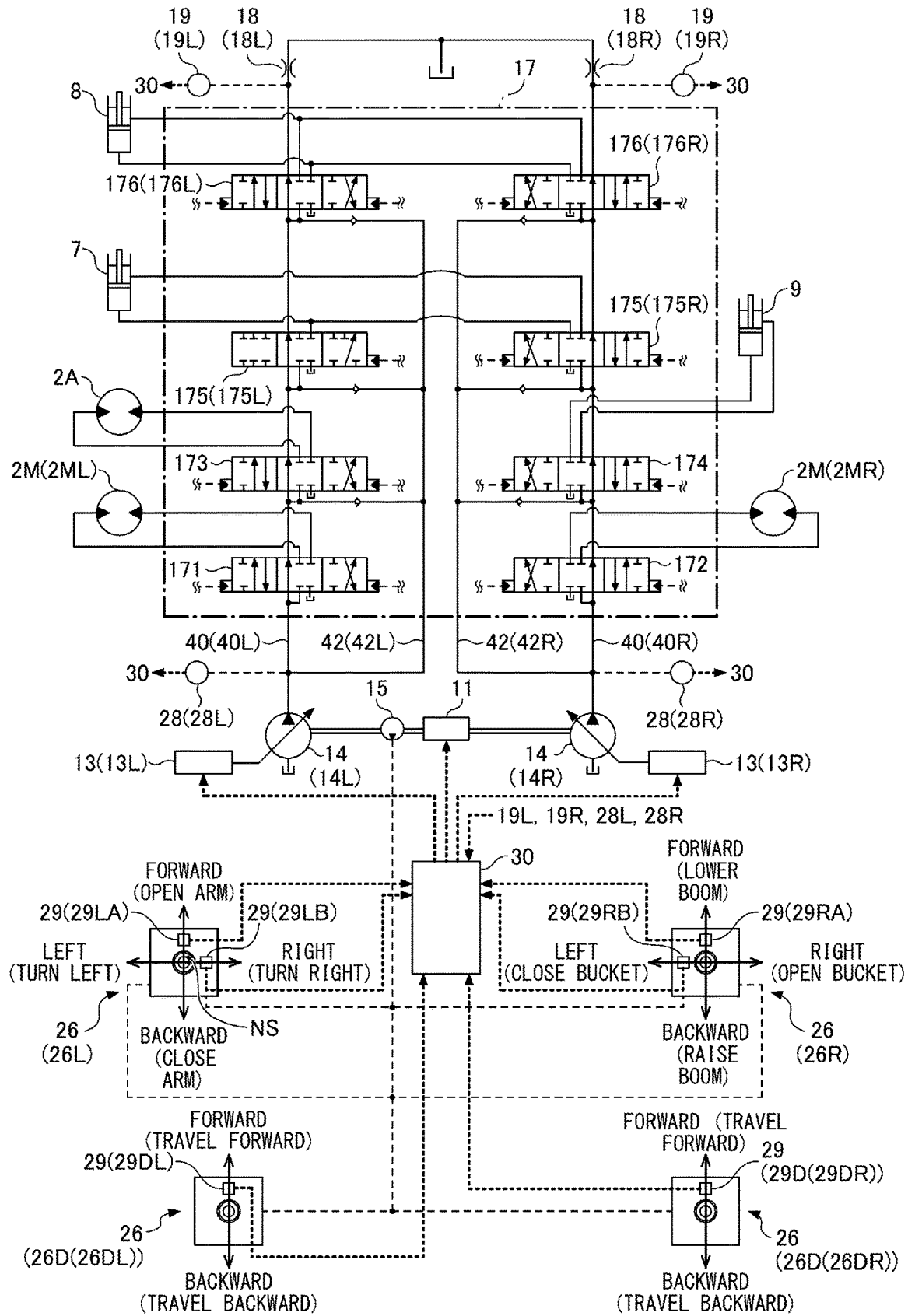
FIG. 3 is a drawing illustrating an example of configuration of a hydraulic system provided in the shovel of FIG. 1.

Next, an example of configuration of a hydraulic system provided in the shovel 100 is explained with reference to FIG. 3. FIG. 3 is a drawing illustrating an example of configuration of a hydraulic system provided in the shovel 100. In FIG. 3, the mechanical power system, the hydraulic oil line, the pilot line, and the electrical control system are indicated as double, solid, dashed, and dotted lines, respectively.

The hydraulic system of the shovel 100 mainly includes an engine 11, a regulator 13, a main pump 14, a pilot pump 15, a control valve unit 17, an operation apparatus 26, a discharge pressure sensor 28, an operation pressure sensor 29, a controller 30, and the like.

In FIG. 3, the hydraulic system is configured such that the hydraulic oil can circulate from the main pump 14 driven by the engine 11 to the hydraulic oil tank through a center bypass line 40 or a parallel oil line 42.

The engine 11 is the drive source for the shovel 100. In the present embodiment, for example, the engine 11 is a diesel engine that operates to maintain a predetermined number of revolutions. The output axis of engine 11 is connected to each input axis of the main pump 14 and the pilot pump 15.

The main pump 14 is configured to supply hydraulic oil to the control valve unit 17 via the hydraulic oil line. In the present embodiment, the main pump 14 is a swash plate-type variable displacement hydraulic pump.

The regulator 13 is configured to control the discharge amount of the main pump 14. In the present embodiment, the regulator 13 adjusts the tilt angle of the swash plate of the main pump 14 to control the discharge amount of the main pump 14 in response to control commands from the controller 30.

The pilot pump 15 is an example of a pilot pressure generation device, and is configured to supply hydraulic oil to hydraulic control devices including the operation apparatus 26 via the pilot line. In the present embodiment, the pilot pump 15 is a fixed displacement hydraulic pump. However, the pilot pressure generation device may be implemented with the main pump 14. In other words, the main pump 14 may have a function of supplying hydraulic oil to the control valve unit 17 via the hydraulic oil line, and also a function of supplying hydraulic oil to various hydraulic control devices including the operation apparatus 26 via the pilot line. In this case, the pilot pump 15 may be omitted.

The control valve unit 17 is a hydraulic control device that controls the hydraulic system in the shovel 100. In the present embodiment, the control valve unit 17 includes the control valves 171 to 176. The control valve 175 includes a control valve 175L and a control valve 175R, and the control valve 176 includes a control valve 176L and a control valve 176R. The control valve unit 17 is configured to selectively supply hydraulic oil discharged by the main pump 14 to one or more hydraulic actuators through the control valves 171 to 176. For example, the control valves 171 to 176 control the flow rate of hydraulic oil flowing from the main pump 14 to the hydraulic actuators, and the flow rate of hydraulic oil flowing from the hydraulic actuators to the hydraulic oil tank. The hydraulic actuators include the boom cylinder 7, the arm cylinder 8, the bucket cylinder 9, the left traveling hydraulic motor 2ML, the right traveling hydraulic motor 2MR, and the turning hydraulic motor 2A.

The operation apparatus 26 is configured so that the hydraulic oil discharged by the pilot pump 15 can be supplied to the pilot port of the corresponding control valve in the control valve unit 17 via the pilot line. The pressure (the pilot pressure) of hydraulic oil supplied to each of the pilot ports is a pressure corresponding to the operation direction and the operation amount of the operation apparatus 26 corresponding to each of the hydraulic actuators. However, the operation apparatus 26 may be an electric control type instead of the pilot pressure type as described above. In this case, the control valve in the control valve unit 17 may be an electromagnetic solenoid spool valve.

The discharge pressure sensor 28 is configured to detect the discharge pressure of the main pump 14. In the present embodiment, the discharge pressure sensor 28 outputs the detected value to the controller 30.

The operation pressure sensor 29 is configured to detect the content of the operation of the operation apparatus 26 by the operator. In the present embodiment, the operation pressure sensor 29 detects the operation direction and the operation amount of the operation apparatus 26 corresponding to each of the actuators in the form of pressure (an operation pressure), and outputs the detected value to the controller 30. The movement content of the operation apparatus 26 may be detected by using a sensor other than the operation pressure sensor.

The main pump 14 includes a left main pump 14L and a right main pump 14R. The left main pump 14L is configured to circulate the hydraulic oil to the hydraulic oil tank through the left center bypass line 40L or the left parallel line 42L. The right main pump 14R is configured to circulate the hydraulic oil to the hydraulic oil tank through the right center bypass line 40R or the right parallel line 42R.

The left center bypass line 40L is a hydraulic oil line through the control valves 171, 173, 175L, and 176L disposed in the control valve unit 17. The right center bypass line 40R is a hydraulic oil line through the control valves 172, 174, 175R, and 176R disposed in the control valve unit 17.

The control valve 171 is a spool valve that supplies the hydraulic oil discharged by the left main pump 14L to the left traveling hydraulic motor 2ML and switches the flow of the hydraulic oil to discharge the hydraulic oil discharged by the left traveling hydraulic motor 2ML to the hydraulic oil tank.

The control valve 172 is a spool valve that supplies the hydraulic oil discharged by the right main pump 14R to the right traveling hydraulic motor 2MR and switches the flow of the hydraulic oil to discharge the hydraulic oil discharged by the right traveling hydraulic motor 2MR to the hydraulic oil tank.

The control valve 173 is a spool valve that supplies the hydraulic oil discharged by the left main pump 14L to the turning hydraulic motor 2A and switches the flow of the hydraulic oil so that the hydraulic oil is discharged by the turning hydraulic motor 2A to the hydraulic oil tank.

The control valve 174 is a spool valve that supplies the hydraulic oil discharged by the right main pump 14R to the bucket cylinder 9 and switches the flow of the hydraulic oil so that the hydraulic oil in the bucket cylinder 9 is discharged to the hydraulic oil tank.

The control valve 175L is a spool valve that switches the flow of the hydraulic oil to supply the hydraulic oil discharged by the left main pump 14L to the boom cylinder 7. The control valve 175R is a spool valve that supplies the hydraulic oil discharged by the right main pump 14R to the boom cylinder 7 and switches the flow of the hydraulic oil so that the hydraulic oil in the boom cylinder 7 is discharged to the hydraulic oil tank.

The control valve 176L is a spool valve that supplies the hydraulic oil discharged by the left main pump 14L to the arm cylinder 8 and switches the flow of the hydraulic oil so that the hydraulic oil in the arm cylinder 8 is discharged to the hydraulic oil tank.

The control valve 176R is a spool valve that supplies the hydraulic oil discharged by the right main pump 14R to the arm cylinder 8 and switches the flow of the hydraulic oil so that the hydraulic oil in the arm cylinder 8 is discharged to the hydraulic oil tank.

The left parallel line 42L is a hydraulic oil line parallel to the left center bypass line 40L. When the flow of the hydraulic oil passing through the left center bypass line 40L is restricted or interrupted by any of the control valves 171, 173, or 175L, the left parallel line 42L can supply the hydraulic oil to downstream control valves. The right parallel line 42R is a hydraulic oil line parallel to the right center bypass line 40R. When the flow of the hydraulic oil passing through the right center bypass line 40R is restricted or interrupted by any of the control valves 172, 174, or 175R, the right parallel line 42R can supply the hydraulic oil to downstream control valves.

The regulator 13 includes a left regulator 13L and a right regulator 13R. The left regulator 13L controls the discharge amount of the left main pump 14L by adjusting the swashplate tilt angle of the left main pump 14L corresponding to the discharge pressure of the left main pump 14L. Specifically, the left regulator 13L adjusts the swashplate tilt angle of the left main pump 14L corresponding to an increase in the discharge pressure of the left main pump 14L to reduce the discharge amount, for example. The same applies to the right regulator 13R. This is because the absorbing horsepower of the main pump 14, which is represented as the product of the discharge pressure and the discharge amount, is not caused to exceed the output horsepower of the engine 11.

The operation apparatus 26 includes a left operation lever 26L, a right operation lever 26R and a traveling lever 26D. The traveling lever 26D includes a left traveling lever 26DL and a right traveling lever 26DR.

The left operation lever 26L is used for the turning operations and the operation of the arm 5. When the left operation lever 26L is operated in the forward-backward direction, the left operation lever 26L utilizes the hydraulic oil discharged by the pilot pump 15 to apply the control pressure corresponding to the lever operation amount to a pilot port of the control valve 176. Also, when the left operation lever 26L is operated in the right-left direction, the left operation lever 26L utilizes the hydraulic oil discharged by the pilot pump 15 to apply the control pressure corresponding to the lever operation amount to a pilot port of the control valve 173.

Specifically, when the left operation lever 26L is operated in the arm closing direction, the left operation lever 26L introduces the hydraulic oil to a right pilot port of the control valve 176L and introduces the hydraulic oil to a left pilot port of the control valve 176R. Also, when the left operation lever 26L is operated in the arm opening direction, the left operation lever 26L introduces the hydraulic oil to a left pilot port of the control valve 176L and introduces the hydraulic oil to a right pilot port of the control valve 176R. Also, when the left operation lever 26L is operated in the left turning direction, the left operation lever 26L introduces the hydraulic oil to a left pilot port of the control valve 173, and when the left operation lever 26L is operated in the right turning direction, the left operation lever 26L introduces the hydraulic oil to a right pilot port of the control valve 173.

The right operation lever 26R is used to operate the boom 4 and the bucket 6. When the right operation lever 26R is operated in a forward-backward direction, the right operation lever 26R utilizes the hydraulic oil discharged by the pilot pump 15 to apply the control pressure corresponding to the lever operation amount to a pilot port of the control valve 175. Also, when the right operation lever 26R is operated in the left-and-right direction, the right operation lever 26R utilizers the hydraulic oil discharged by the pilot pump 15 to apply the control pressure corresponding to the lever operation amount to a pilot port of the control valve 174.

Specifically, when the right operation lever 26R is operated in the boom lowering direction, the right operation lever 26R introduces the hydraulic oil to a right pilot port of the control valve 175R. Also, when the right operation lever 26R is operated in the boom raising direction, the right operation lever 26R introduces the hydraulic oil to a right pilot port of the control valve 175L and introduces the hydraulic oil to a left pilot port of the control valve 175R. Also, when the right operation lever 26R is operated in the bucket closing direction, the right operation lever 26R introduces the hydraulic oil to a left pilot port of the control valve 174 and, when it is operated in the bucket opening direction, introduces the hydraulic oil to a right pilot port of the control valve 174.

The traveling lever 26D is used to operate the crawler 1C. Specifically, the left traveling lever 26DL is used to operate the left crawler 1CL. The left traveling lever 26DL may be configured to interlock with a left drive pedal. When the left traveling lever 26DL is operated in the forward-backward direction, the left traveling lever 26DL utilizes the hydraulic oil discharged by the pilot pump 15 to apply the control pressure corresponding to the lever operation amount to a pilot port of the control valve 171. The right traveling lever 26DR is used to operate the right crawler 1CR. The right traveling lever 26DR may be configured to interlock with a right drive pedal. When the right traveling lever 26DR is operated in the forward-backward direction, the right traveling lever 26DR utilizes the hydraulic oil discharged by the pilot pump 15 to apply the control pressure corresponding to the lever operation amount to a pilot port of the control valve 172.

The discharge pressure sensor 28 includes a discharge pressure sensor 28L and a discharge pressure sensor 28R. The discharge pressure sensor 28L detects the discharge pressure of the left main pump 14L and outputs a detected value to the controller 30. The same applies to the discharge pressure sensor 28R.

The operation pressure sensor 29 includes operation pressure sensors 29LA, 29LB, 29RA, 29RB, 29DL, and 29DR. The operation pressure sensor 29LA detects the movement content of the forward-backward direction for the left operation lever 26L by an operator in the form of pressure and outputs the detected value to the controller 30. For example, the movement content may be the lever operation direction and the lever operation amount (lever operation angle) or the like.

Similarly, the operation pressure sensor 29LB detects movement content of the left-and-right direction for the left operation lever 26L by an operator in the form of pressure and outputs the detected value to the controller 30. The operation pressure sensor 29RA detects movement content of the forward-backward direction for the right operation lever 26R by an operator in the form of pressure and outputs the detected value to the controller 30. The operation pressure sensor 29RB detects the movement content of the left-and-right direction by an operator for the right operation lever 26R in the form of pressure and outputs the detected value to the controller 30. The operation pressure sensor 29DL detects the movement content of the forward-backward direction for the left traveling lever 26DL by an operator in the form of pressure and outputs the detected value to the controller 30. The operation pressure sensor 29DR detects the movement content of the forward-backward direction for the right traveling lever 26DR by an operator in the form of pressure and outputs the detected value to the controller 30.

The controller 30 receives outputs of the operation pressure sensor 29 and feeds a control command to the regulator 13 as needed to change the discharge amount of the main pump 14. Also, the controller 30 receives the outputs of the control pressure sensor 19 provided in the upstream of a throttle 18 and outputs a control command to the regulator 13 to change the discharge amount of the main pump 14 as needed. The throttle 18 includes a left throttle 18L and a right throttle 18R, and the control pressure sensor 19 includes a left control pressure sensor 19L and a right control pressure sensor 19R.

A left throttle 18L is disposed between the control valve 176L, which is the most downstream, and the hydraulic oil tank in the left center bypass line 40L. Therefore, the flow of the hydraulic oil discharged by the left main pump 14L is limited by the left throttle 18L. The left throttle 18L generates the control pressure for controlling the left regulator 13L. The left control pressure sensor 19L is a sensor for detecting the control pressure and outputs a detected value to the controller 30. The controller 30 controls the discharge amount of the left main pump 14L by adjusting the swashplate tilt angle of the left main pump 14L corresponding to the control pressure. The controller 30 decreases the discharge amount of the left main pump 14L in accordance with an increase in the control pressure, and increases the discharge amount of the left main pump 14L in accordance with a decrease in the control pressure. The discharge amount of the right main pump 14R is similarly controlled.

Specifically, if the hydraulic actuators in the shovel 100 are in a standby state where none of the hydraulic actuators is operated as shown in FIG. 3, the hydraulic oil discharged by the left main pump 14L passes through the left center bypass line 40L and reaches the left throttle 18L. The flow of hydraulic oil discharged by the left main pump 14L increases the control pressure generated in the upstream of the left throttle 18L. As a result, the controller 30 decreases the discharge amount of the left main pump 14L to an allowable minimum discharge amount to suppress a pressure loss (pumping loss) caused by the hydraulic oil discharged by the left main pump 14L passing through the left center bypass line 40L. On the other hand, if any of the hydraulic actuators is operated, the hydraulic oil discharged by the left main pump 14L flows into a to-be-operated hydraulic actuator through a control valve corresponding to the to-be-operated hydraulic actuator. Then, the flow of the hydraulic oil discharged by the left main pump 14L decreases or disappears the amount reaching the left throttle 18L, thereby lowering the control pressure generated in the upstream of the left throttle 18L. As a result, the controller 30 increases the discharge amount of the left main pump 14L and allows a sufficient amount of the hydraulic oil to flow into the to-be-operated hydraulic actuator so as to ensure that the to-be-operated hydraulic actuator can operate. Note that the controller 30 controls the discharge amount of the right main pump 14R in the same manner.

According to the arrangement sated above, the hydraulic system in FIG. 3 can reduce energy consumption wasted for the main pump 14 in the standby mode. The wasteful energy consumption includes a pumping loss caused by the hydraulic oil discharged by the main pump 14 in the center bypass line 40. Also, if a hydraulic actuator is operated, the hydraulic system in FIG. 3 ensures that a necessary and sufficient amount of the hydraulic oil can be supplied from the main pump 14 to the to-be-operated hydraulic actuator.

Figure 4A:
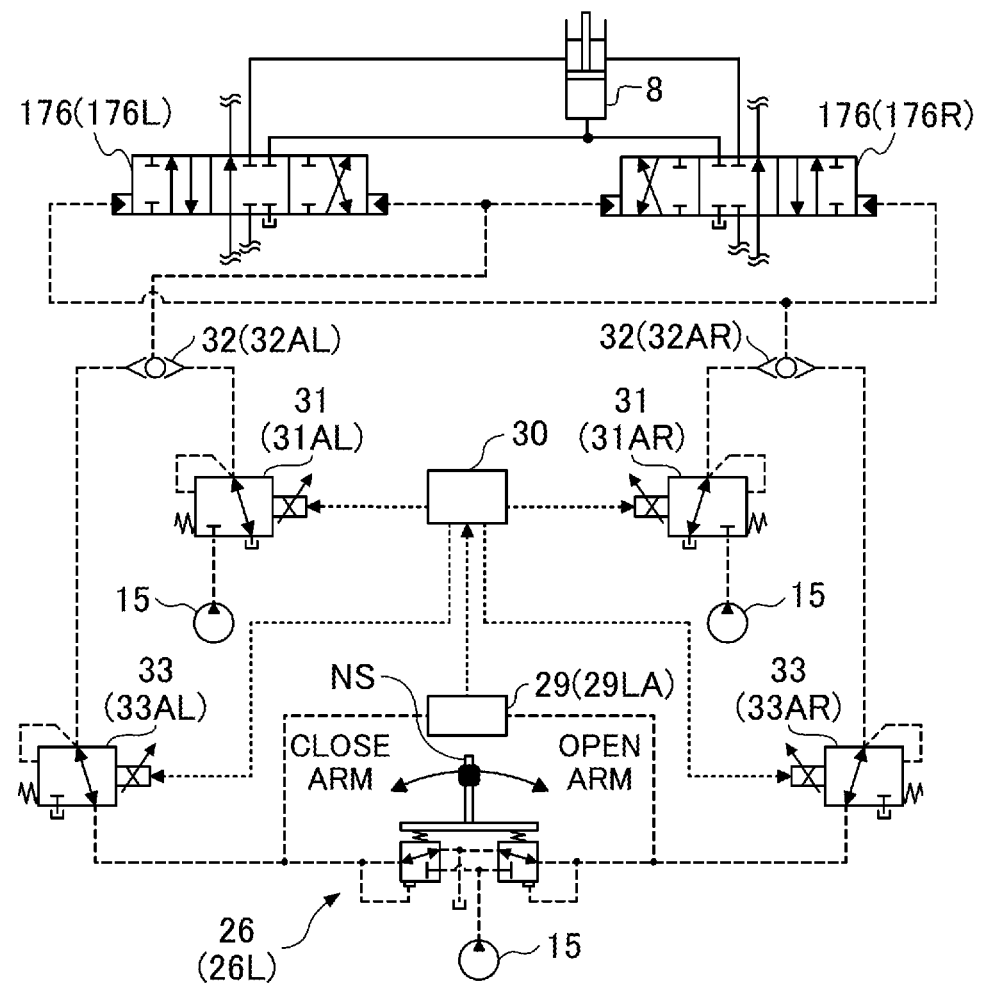
FIG. 4A is a drawing illustrating a portion of the hydraulic system related to an operation of an arm cylinder.
Figure 4B:
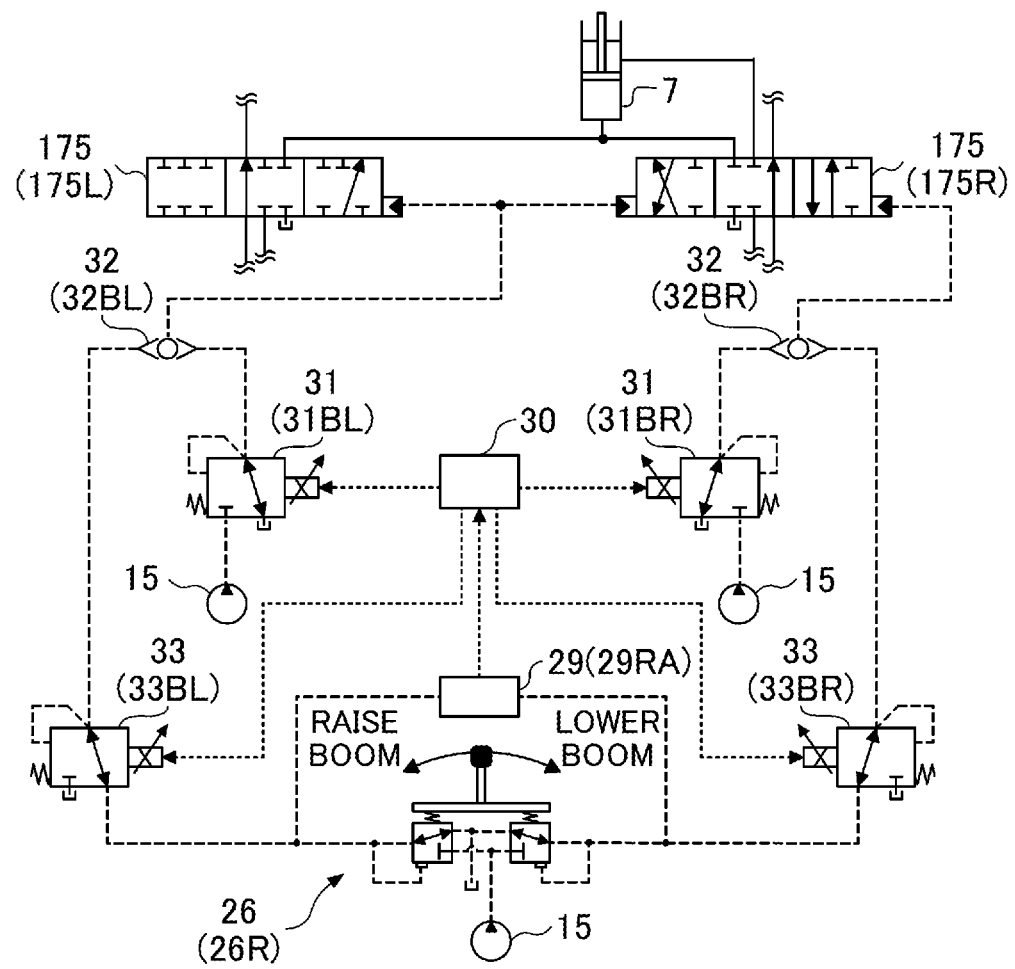
FIG. 4B is a drawing illustrating a portion of the hydraulic system related to an operation of a boom cylinder.
Figure 4C:
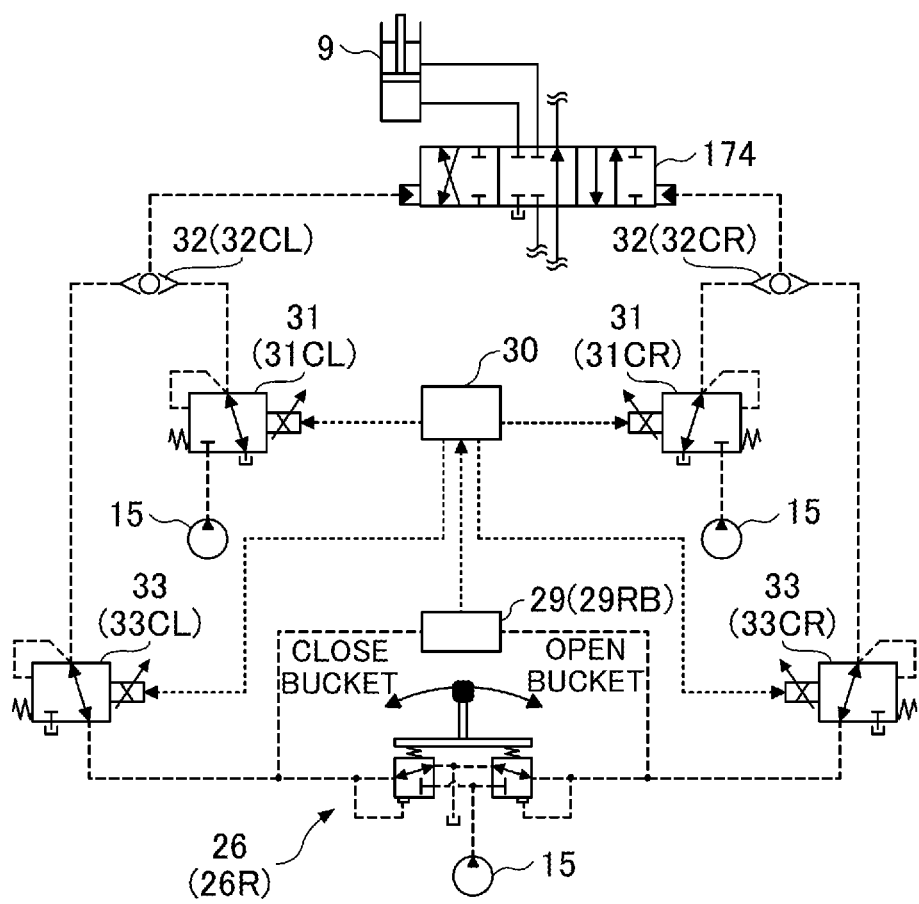
FIG. 4C is a drawing illustrating a portion of the hydraulic system related to an operation of a bucket cylinder.
Figure 4D:
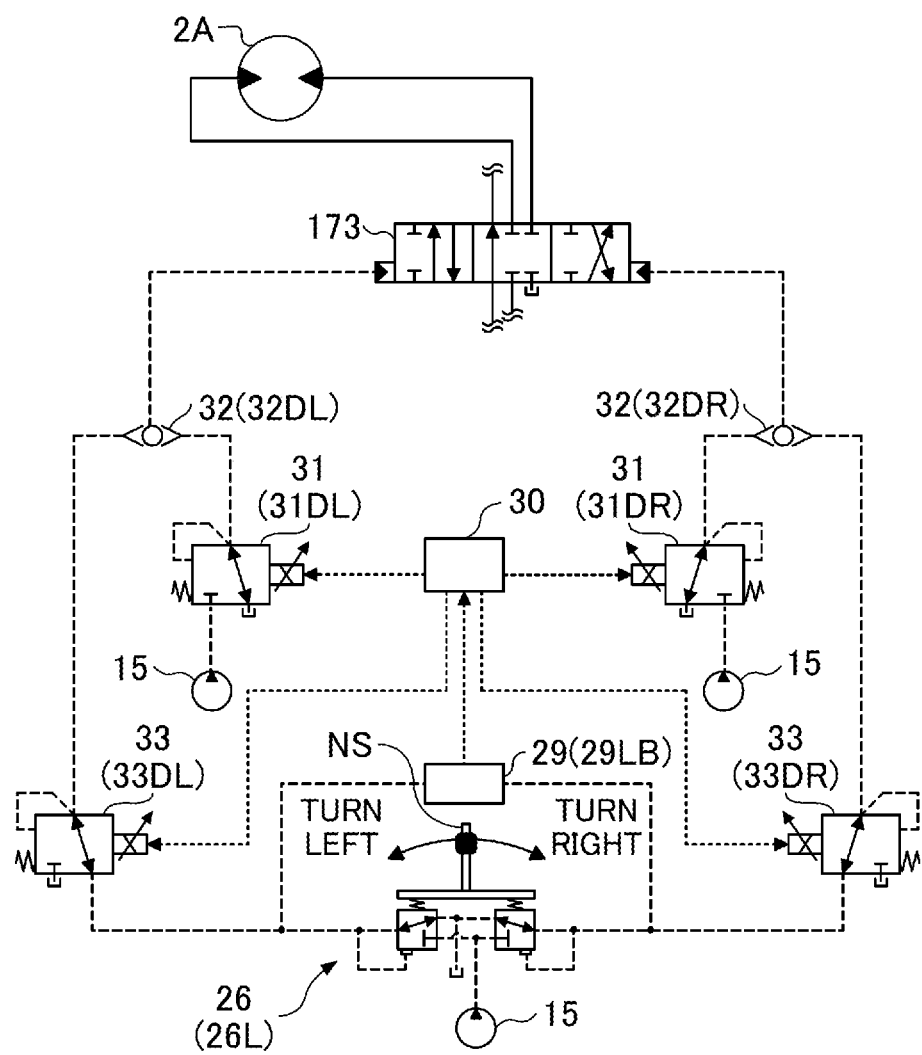
FIG. 4D is a drawing illustrating a portion of the hydraulic system related to an operation of a turning hydraulic motor.

Next, an arrangement for enabling the controller 30 to automatically operate an actuator by means of a machine control function is described with reference to FIGS. 4A to 4D. FIGS. 4A to 4D are views of portions of a hydraulic system. Specifically, FIG. 4A is a view of a portion of the hydraulic system related to operations of the arm cylinder 8, and FIG. 4B is a view of a portion of the hydraulic system related to operations of the boom cylinder 7. Also, FIG. 4C is a view of a portion of the hydraulic system related to operations of the bucket cylinder 9, and FIG. 4D is a view of a portion of the hydraulic system related to operations of the turning hydraulic motor 2A.

As shown in FIGS. 4A to 4D, the hydraulic system includes a proportional valve 31, a shuttle valve 32, and a proportional valve 33. The proportional valve 31 includes proportional valves 31AL to 31DL and 31AR to 31DR, the shuttle valve 32 includes shuttle valves 32AL to 32DL and 32AR to 32DR, and the proportional valve 33 includes proportional valves 33AL to 33DL and 33AR to 33DR.

The proportional valve 31 is configured to function as a machine control valve. The proportional valve 31 is disposed in a conduit that connects the pilot pump 15 to the shuttle valve 32 and is configured to vary the area of the flow path in the conduit. In this embodiment, the proportional valve 31 operates in response to a control command output by the controller 30. Thus, the controller 30 can supply the hydraulic oil discharged by the pilot pump 15 to a pilot port of the corresponding control valve in the control valve unit 17 via the proportional valve 31 and the shuttle valve 32, regardless of operator's operations of the operation apparatus 26.

The shuttle valve 32 has two inlet ports and one outlet port. One of the two inlet ports is connected to the operation apparatus 26, and the other is connected to the proportional valve 31. The outlet port is connected to the pilot port of the corresponding control valve in control valve unit 17. Thus, the shuttle valve 32 can apply the pilot pressure generated by the operation apparatus 26 or the pilot pressure generated by the proportional valve 31, whichever is higher, to the pilot port of the corresponding control valve.

Similar to the proportional valve 31, the proportional valve 33 functions as a control valve for machine control. The proportional valve 33 is disposed in a conduit that connects the operation apparatus 26 and the shuttle valve 32 and is configured to vary the area of the flow path in the conduit. In the present embodiment, the proportional valve 33 operates in response to a control command output by the controller 30. Thus, the controller 30 can reduce the pressure of the hydraulic oil discharged from the operation apparatus 26 and supply the hydraulic oil to the pilot port of the corresponding control valve in the control valve unit 17 via the shuttle valve 32, regardless of operator's operations of the operation apparatus 26.

According to this arrangement, even if no operation is performed on the particular operation apparatus 26, the controller 30 can operate a hydraulic actuator corresponding to the particular operation apparatus 26. In addition, even if an operation is performed on the particular operation apparatus 26, the controller 30 can forcibly stop the operation of the hydraulic actuator corresponding to the particular operation apparatus 26.

For example, as shown in FIG. 4A, the left operation lever 26L is used to operate the arm 5. Specifically, the left operation lever 26L utilizes the hydraulic oil discharged by the pilot pump 15 to apply the pilot pressure corresponding to operations in the forward-backward direction to a pilot port of the control valve 176. More specifically, if the left operation lever 26L is operated in the arm closing direction (backward direction), the left operation lever 26L applies the pilot pressure corresponding to the operation amount to a right pilot port of the control valve 176L and a left pilot port of the control valve 176R. Also, if the left operation lever 26L is operated in the arm opening direction (forward direction), the left operation lever 26L applies the pilot pressure corresponding to the operation amount to a left pilot port of the control valve 176L and a right pilot port of the control valve 176R.

A switch NS is provided to the left operation lever 26L. In this embodiment, the switch NS is a push-button switch provided at the end of the left operation lever 26L. An operator can manually operate the left operation lever 26L while pushing the switch NS with a finger. The switch NS may be provided on the right operation lever 26R or at another position within the cab 10.

The operation pressure sensor 29LA detects the movement content for the left operation lever 26L in the forward-backward direction by an operator in the form of pressure and outputs the detected value to the controller 30.

The proportional valve 31AL operates in response to a control command (an electric current command) fed from the controller 30. The proportional valve 31AL adjusts the pilot pressure of hydraulic oil introduced from the pilot pump 15 to a right pilot port of the control valve 176L and a left pilot port of the control valve 176R through the proportional valve 31AL and the shuttle valve 32AL. The proportional valve 31AR operates in response to a control command (an electric current command) fed from the controller 30. The proportional valve 31AR adjusts the pilot pressure of hydraulic oil introduced from the pilot pump 15 to a left pilot port of the control valve 176L and a right pilot port of the control valve 176R through the proportional valve 31AR and the shuttle valve 32AR. The proportional valves 31AL, 31AR can adjust the pilot pressure so that the control valves 176L, 176R can be stopped at any valve position.

According to this arrangement, the controller 30 can supply the hydraulic oil discharged by the pilot pump 15 to the right pilot port of the control valve 176L and the left pilot port of the control valve 176R through the proportional valve 31AL and the shuttle valve 32AL, regardless of arm closing operations by an operator. In other words, the controller 30 can automatically close the arm 5. Also, the controller 30 may supply the hydraulic oil discharged by the pilot pump 15 to the left pilot port of the control valve 176L and the right pilot port of the control valve 176R through the proportional valve 31AR and shuttle valve 32AR, regardless of arm opening operations by the operator. In other words, the controller 30 can automatically open the arm 5.

The proportional valve 33AL operates in response to a control command (an electric current command) fed from the controller 30. The proportional valve 33AL reduces the pilot pressure of hydraulic oil introduced to the right pilot port of the control valve 176L and the left pilot port of the control valve 176R from the pilot pump 15 via the left operation lever 26L, the proportional valve 33AL, and the shuttle valve 32AL. The proportional valve 33AR operates in response to a control command (an electric current command) fed from the controller 30. The proportional valve 33AR reduces the pilot pressure of hydraulic oil introduced to the left pilot port of the control valve 176L and the right pilot port of the control valve 176R from the pilot pump 15 via the left operation lever 26L, the proportional valve 33AR, and the shuttle valve 32AR. The proportional valves 33AL, 33AR can adjust the pilot pressure so that the control valves 176L, 176R can be stopped at any valve position.

According to this arrangement, even if the operator is performing an arm closing operation, the controller 30 can forcibly stop, as necessary, the closing movement of the arm 5 by reducing the pilot pressure applied to the closing-side pilot ports of the control valve 176 (the left pilot port of the control valve 176L and the right pilot port of the control valve 176R). This is also applicable to the case where an opening movement of the arm 5 is forcibly stopped when the operator is performing an arm opening operation.

Alternatively, even if the operator is performing an arm closing operation, as necessary, the controller 30 may forcibly stop a closing operation of the arm 5 by controlling the proportional valve 31AR to increase the pilot pressure applied the opening-side pilot ports of the control valve 176 (the right pilot port of the control valve 176L and the left pilot port of the control valve 176R), which are on the opposite side of the closing-side pilot port of the control valve 176, thereby forcibly returning the control valve 176 back to the neutral position. In this case, the proportional valve 33AL may be omitted. This is also applicable to the case where an opening movement of the arm 5 is forcibly stopped when the operator is performing an arm opening operation.

Although explanation with reference to FIG. 4B to FIG. 4D is hereinafter omitted, the above explanation is also applicable to a case where the movement of the boom 4 is forcibly stopped when the operator is performing a boom raising operation or a boom lowering operation, a case where the movement of the bucket 6 is forcibly stopped when the operator is performing a bucket closing operation or a bucket opening operation, and a case where the turning movement of the upper turning body 3 is forcibly stopped when the operator is performing a turning operation. Further, the above is also applicable to the case where the turning movement of the lower traveling body 1 is forcibly stopped when the operator is performing a traveling operation.

Also, as shown in FIG. 4B, the right operation lever 26R is used to operate the boom 4. Specifically, the right operation lever 26R utilizes the hydraulic oil discharged by the pilot pump 15 to apply the pilot pressure corresponding to operations in the forward-backward direction to the pilot port of the control valve 175. More specifically, if the right operation lever 26R is operated in the boom raising direction (backward direction), the right operation lever 26R applies the pilot pressure corresponding to the operation amount to the right pilot port of the control valve 175L and the left pilot port of the control valve 175R. Also, if the right operation lever 26R is operated in the boom lowering direction (forward direction), the right operation lever 26R applies the pilot pressure corresponding to the operation amount to the right pilot port of the control valve 175R.

The operation pressure sensor 29RA detects, in the form of pressure, the movement content of the forward-and-backward operation performed by the operator with the right operation lever 26R, and outputs the detected value to the controller 30.

A proportional valve 31BL operates in response to a control command (an electric current command) fed from the controller 30. The proportional valve 31BL adjusts the pilot pressure of hydraulic oil introduced from the pilot pump 15 to the right pilot port of the control valve 175L and the left pilot port of the control valve 175R through the proportional valve 31BL and shuttle valve 32BL. The proportional valve 31BR operates in response to a control command (an electric current command) fed from the controller 30. The proportional valve 31BR adjusts the pilot pressure of hydraulic oil introduced from the pilot pump 15 to t the left pilot port of the control valve 175L and the right pilot port of the control valve 175R through the proportional valve 31BR and the shuttle valve 32BR. The proportional valves 31BL, 31BR can adjust the pilot pressure so that the control valves 175L, 175R can be stopped at any valve position.

According to this arrangement, the controller 30 can supply the hydraulic oil discharged by the pilot pump 15 to the right pilot port of the control valve 175L and the left pilot port of the control valve 175R via the proportional valve 31BL and shuttle valve 32BL, regardless of the operator's left turn operation. In other words, the boom 4 can be raised. Also, the controller 30 may supply the hydraulic oil discharged by the pilot pump 15 to the right pilot port of the control valve 175R through the proportional valve 31BR and the shuttle valve 32BR regardless of the operator's boom lowering operation. In other words, the boom 4 can be lowered.

Also, as shown in FIG. 4C, the right operation lever 26R is used to operate the bucket 6. Specifically, the right operation lever 26R utilizes the hydraulic oil discharged by the pilot pump 15 to apply the pilot pressure corresponding to operations in the left-and-right direction to the pilot port of the control valve 174. More specifically, if the right operation lever 26R is operated in the bucket closing direction (left direction), the right operation lever 26R applies the pilot pressure corresponding to the operation amount to the left pilot port of the control valve 174. Also, if the right operation lever 26R is operated in the bucket opening direction (right direction), the right operation lever 26R applies the pilot pressure corresponding to the operation amount to the right pilot port of the control valve 174.

The operation pressure sensor 29RB detects the movement content for the right operation lever 26R by an operator in the left-and-right direction in the form of pressure and outputs the detected value to the controller 30.

The proportional valve 31CL operates in response to a control command (an electric current command) fed from the controller 30. The proportional valve 31CL adjusts the pilot pressure of hydraulic oil introduced from the pilot pump 15 to the left pilot port of the control valve 174 through the proportional valve 31CL and the shuttle valve 32CL. The proportional valve 31CR operates in response to a control command (an electric current command) fed from the controller 30. The proportional valve 31CR adjusts the pilot pressure of hydraulic oil introduced from the pilot pump 15 to the right pilot port of the control valve 174 through the proportional valve 31CR and the shuttle valve 32CR. The proportional valves 31CL, 31CR can adjust the pilot pressure so that the control valve 174 can be stopped at any valve position.

According to this arrangement, the controller 30 can supply the hydraulic oil discharged by the pilot pump 15 to the left pilot port of the control valve 174 via the proportional valve 31CL and the shuttle valve 32CL regardless of operator's bucket closing operations. In other words, the bucket 6 can be closed. Also, the controller 30 can supply the hydraulic oil discharged by the pilot pump 15 to the right pilot port of the control valve 174 through the proportional valve 31CR and the shuttle valve 32CR, regardless of the operator's bucket opening operations. In other words, the bucket 6 can be opened.

Also, as shown in FIG. 4D, the left operation lever 26L is used to operate the turning mechanism 2. Specifically, the left operation lever 26L utilizes the hydraulic oil discharged by the pilot pump 15 to apply the pilot pressure corresponding to operations in the left-and-right direction to a pilot port of the control valve 173. More specifically, if the left operation lever 26L is operated in the left turn direction (left direction), the left operation lever 26L applies the pilot pressure corresponding to the operation amount to the left pilot port of the control valve 173. Also, if the left operation lever 26L is operated in the right turn direction (right direction), the left operation lever 26L applies the pilot pressure corresponding to the operation amount to the right pilot port of the control valve 173.

The operation pressure sensor 29LB detects the movement content for the left operation lever 26L by an operator in the left-and-right direction in the form of pressure and outputs the detected value to the controller 30.

The proportional valve 31DL operates in response to a control command (an electric current command) fed from the controller 30. The proportional valve 31DL adjusts the pilot pressure of hydraulic oil introduced from the pilot pump 15 to the left pilot port of the control valve 173 through the proportional valve 31DL and the shuttle valve 32DL. The proportional valve 31DR operates in response to a control command (an electric current command) fed from the controller 30. The proportional valve 31DR adjusts the pilot pressure of hydraulic oil introduced from the pilot pump 15 to the right pilot port of the control valve 173 through the proportional valve 31DR and the shuttle valve 32DR. The proportional valves 31DL, 31DR can adjust the pilot pressure so that the control valve 173 can be stopped at any valve position.

According to this arrangement, the controller 30 can supply the hydraulic oil discharged by the pilot pump 15 to the left pilot port of the control valve 173 via the proportional valve 31DL and the shuttle valve 32DL regardless of operator's left turning operations. In other words, the controller 30 can automatically cause the turning mechanism 2 to turn left. Also, the controller 30 may supply the hydraulic oil discharged by the pilot pump 15 to the right pilot port of the control valve 173 through the proportional valve 31DR and the shuttle valve 32DR, regardless of the operator's right turning operations. In other words, the turning mechanism 2 can be caused to turn right.

The shovel 100 may have a configuration to automatically or autonomously move the lower traveling body 1 forward and backward. In this case, a portion of the hydraulic system related to operation of the left traveling hydraulic motor 2ML and a portion of the hydraulic system related to operation of the right traveling hydraulic motor 2MR may be configured in the same manner as the hydraulic system portion related to the operation of the boom cylinder 7 and the like.

Although, in the embodiment stated above, a hydraulic control lever including a hydraulic pilot circuit is disclosed as a form of the operation apparatus 26, an electric operation lever including an electric pilot circuit instead of the hydraulic operation lever may be employed. In this case, the lever operation amount of the electric operation lever is input as an electric signal into the controller 30. In addition, an electromagnetic valve is provided between the pilot pump 15 and the pilot port of each control valve. The solenoid valve is configured to operate in response to an electric signal from controller 30. With this configuration, when a manual operation is performed using the electric operation lever, the controller 30 can move a corresponding control valve by increasing or decreasing the pilot pressure by controlling the solenoid valve with an electric signal corresponding to the lever operation amount. Each control valve may be constituted by an electromagnetic spool valve. In this case, the electromagnetic spool valve operates in response to an electric signal from the controller 30 that corresponds to the amount of lever operation of the electric operation lever.

Figure 5:
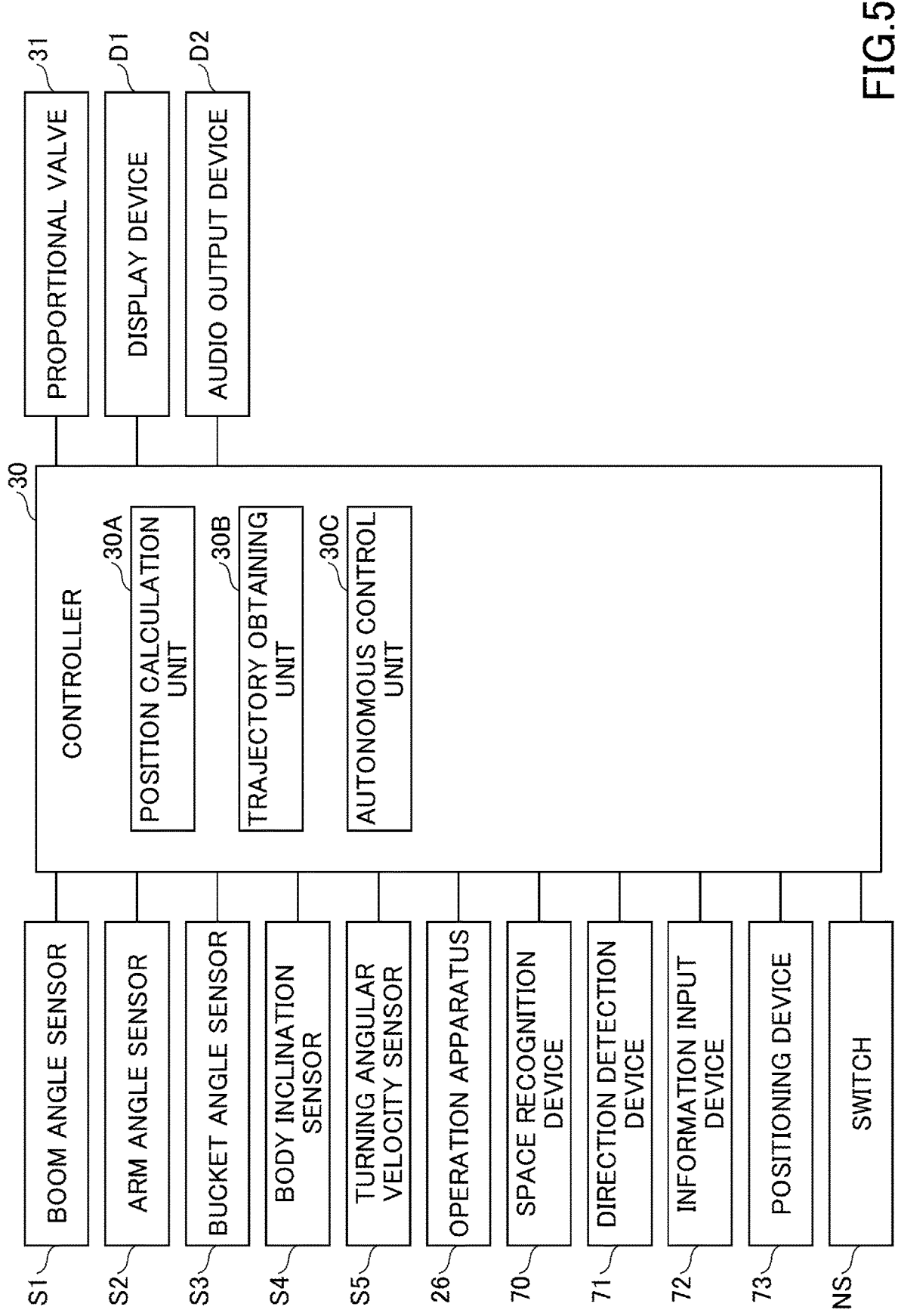
FIG. 5 is a drawing illustrating an example of configuration of a controller.

Next, an example of configuration of the controller 30 is described with reference to FIG. 5. FIG. 5 is a drawing illustrating an example of configuration of the controller 30. In FIG. 5, the controller 30 is configured to receive a signal that is output from at least one of the orientation detection device, the operation apparatus 26, the spatial recognition device 70, the direction detection device 71, the information input device 72, the positioning device 73, the switch NS, and the like. The controller 30 is configured to execute various calculations, and output a control command to at least one of the proportional valve 31, the display device D1, the audio output device D2, and the like. For example, the orientation detection device includes a boom angle sensor S1, an arm angle sensor S2, a bucket angle sensor S3, a body inclination sensor S4, and a turning angular velocity sensor S5. The controller 30 includes a position calculation unit 30A, a trajectory obtaining unit 30B, and an autonomous control unit 30C as functional elements. The functional elements may be constituted by either hardware or software.

The position calculation unit 30A is configured to calculate the position of a positioning target. In the present embodiment, the position calculation unit 30A calculates the coordinate point of a predetermined portion of the attachment in a reference coordinate system. For example, the predetermined portion is a claw tip, a back surface, or the like of the bucket 6. For example, the origin point of the reference coordinate system may be the intersection between the turning axis and the contact area of the shovel 100. For example, the reference coordinate system is an XYZ orthogonal coordinate system, and includes an X axis parallel to the forward-and-backward axis of the shovel 100, a Y axis parallel to the left-and-right axis of the shovel 100, and a Z axis parallel to the turning axis of the shovel 100. For example, the position calculation unit 30A calculates the coordinate point of the claw tip of the bucket 6 from the rotation angles of the boom 4, the arm 5, and the bucket 6. The position calculation unit 30A may calculate not only the coordinate point in the center of the claw tip of the bucket 6 but also the coordinate point at the left end of the claw tip of the bucket 6 and the coordinate point at the right end of the claw tip of the bucket 6. In this case, the position calculation unit 30A may utilize the output of the body inclination sensor S4. The position calculation unit 30A may utilize the output of the positioning device 73 to calculate the coordinate point of the predetermined portion of the attachment in the world coordinate system.

The trajectory obtaining unit 30B is configured to obtain a target trajectory, i.e., a trajectory drawn by the predetermined portion of the attachment when the shovel 100 is caused to operate autonomously. In the present embodiment, the trajectory obtaining unit 30B obtains a target trajectory that is used when the autonomous control unit 30C causes the shovel 100 to operate autonomously. Specifically, the trajectory obtaining unit 30B derives the target trajectory on the basis of data related to a designed surface stored in the non-volatile storage device (hereinafter referred to as "design data"). Typically, the target trajectory is a trajectory that matches the designed surface. The trajectory obtaining unit 30B may derive the target trajectory on the basis of information about the terrain around the shovel 100 recognized by the spatial recognition device 70. Alternatively, the trajectory obtaining unit 30B may derive information about the past trajectory of the claw tip of the bucket 6 from the past output of the orientation detection device stored in the volatile storage device, and derive the target trajectory on the basis of the information. Alternatively, the trajectory obtaining unit 30B may derive the target trajectory on the basis of the current position of the predetermined portion of the attachment and the design data.

The autonomous control unit 30C is configured to cause the shovel 100 to operate autonomously. In the present embodiment, the autonomous control unit 30C is configured to, in a case where a predetermined start condition is satisfied, move the predetermined portion of the attachment along the target trajectory obtained by the trajectory obtaining unit 30B. Specifically, when the operation apparatus 26 is operated while the switch NS is pressed down, the shovel 100 is caused to operate autonomously so that the predetermined portion moves along the target trajectory.

In the present embodiment, the autonomous control unit 30C is configured to cause the actuator to operate autonomously to assist operator's manual operation of the shovel. For example, in a case where the operator is manually performing an arm closing operation while pressing the switch NS, the autonomous control unit 30C may autonomously extend or retract at least one of the boom cylinder 7, the arm cylinder 8, and the bucket cylinder 9 so that the positions of the target trajectory and the claw tip of the bucket 6 match with each other. In this case, for example, by simply operating the left operation lever 26L in the arm closing direction, the operator can close the arm 5 while the claw tip of the bucket 6 is caused to match with the target trajectory.

In the present embodiment, the autonomous control unit 30C can cause each actuator to operate autonomously by individually adjusting the pilot pressure applied to the control valve corresponding to the actuator in question by giving a control command (an electric current command) to the proportional valve 31. For example, regardless of whether the right operation lever 26R is tilted or not, at least one of the boom cylinder 7 and the bucket cylinder 9 can be caused to operate.

Figure 6:
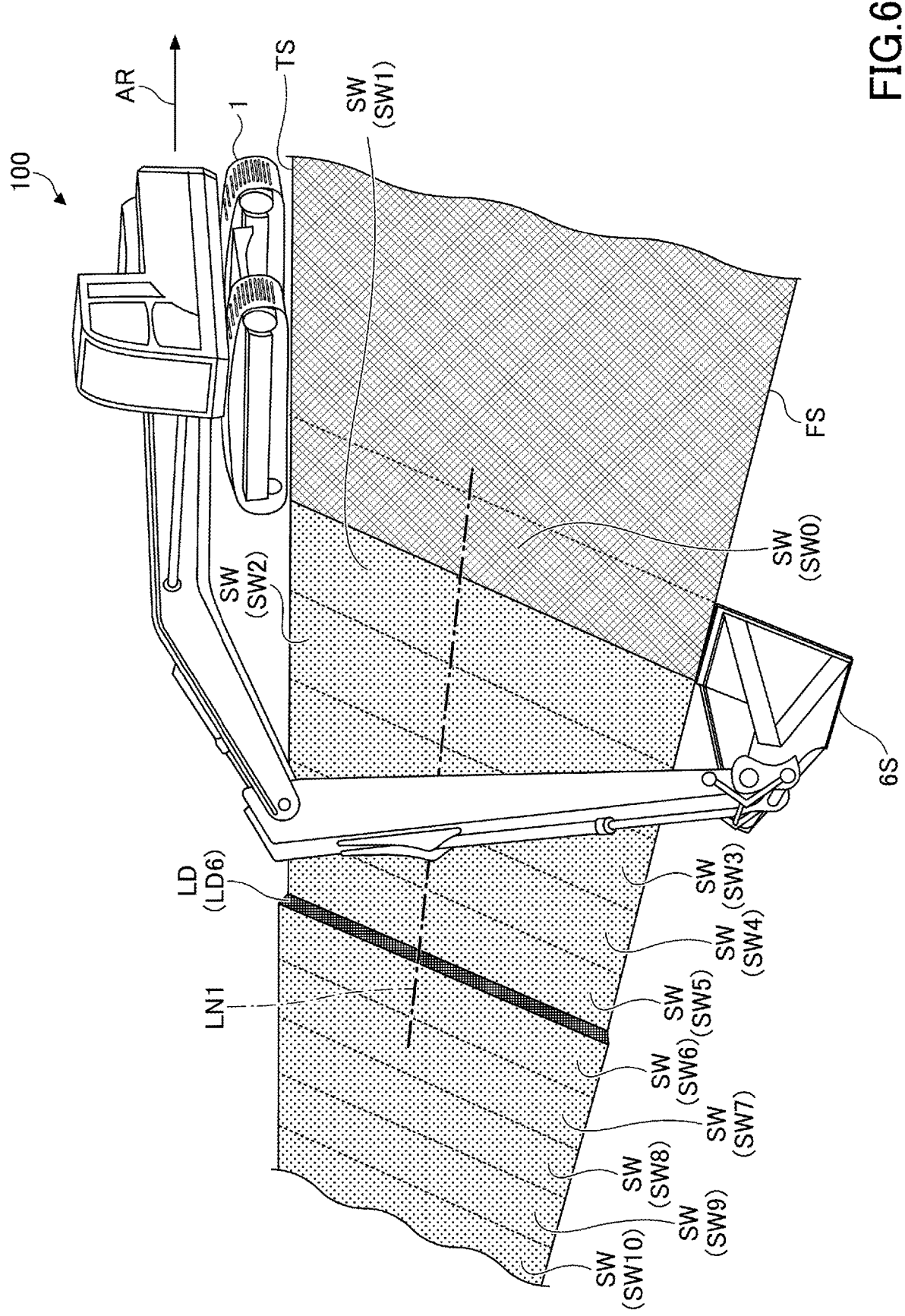
FIG. 6 is a perspective view of a shovel that is executing a finishing task of a down-sloped surface.
Figure 7:
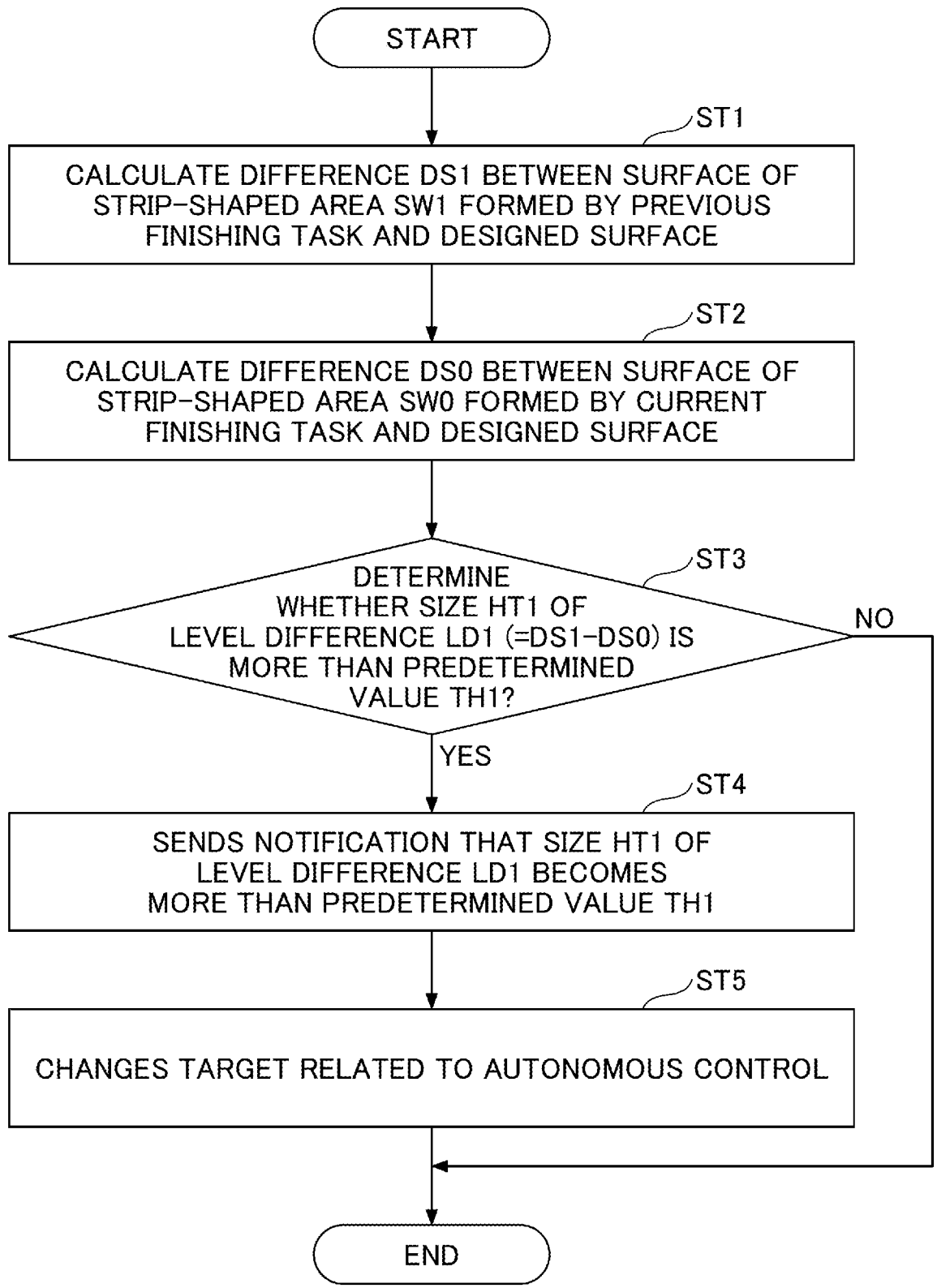
FIG. 7 is a flowchart illustrating a first assistance processing.
Figure 8:
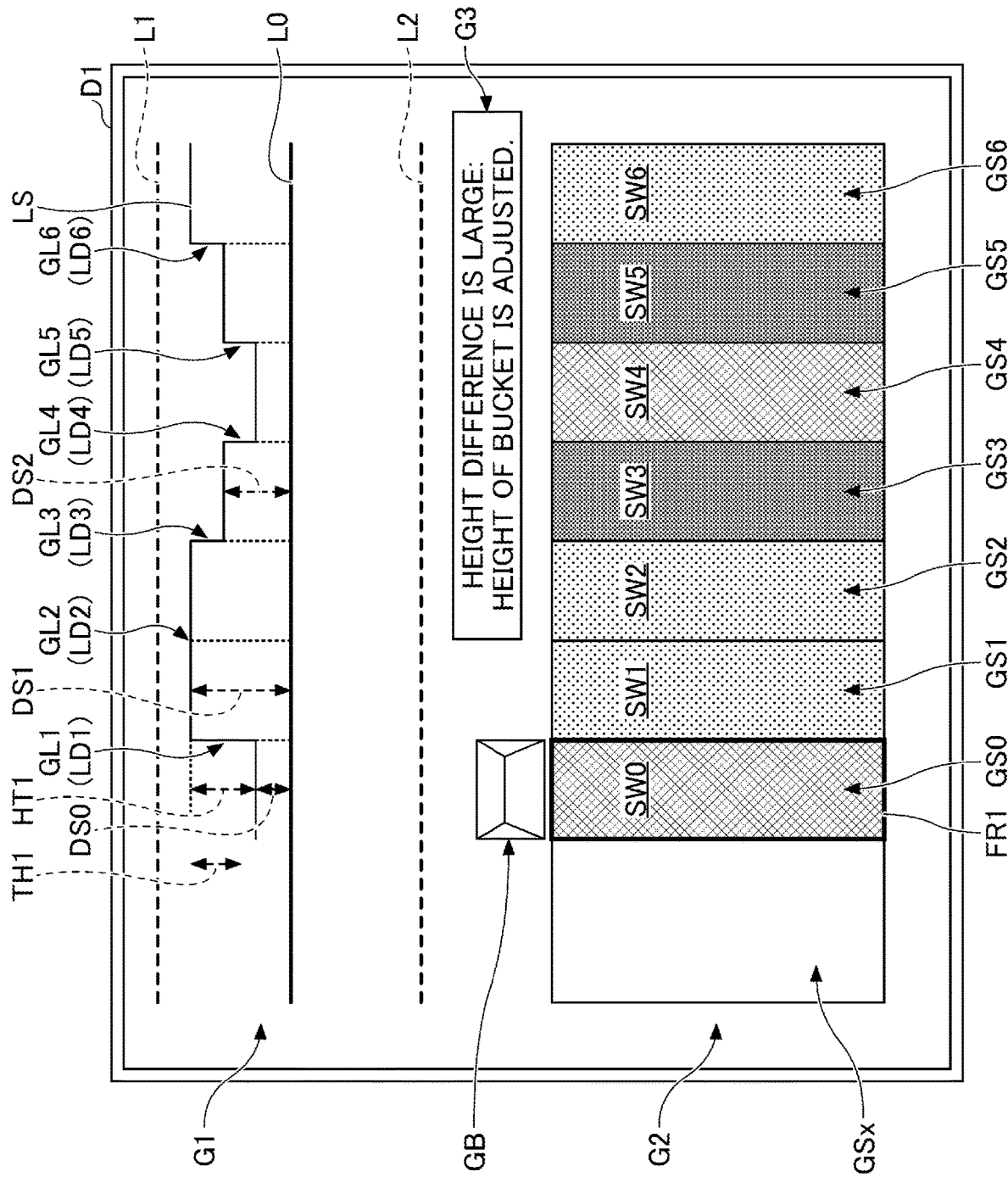
FIG. 8 is an example of configuration of a first assistance screen.

Next, processing performed by the controller 30 to assist the operator in a sloped surface finishing task (hereinafter referred to as "first assistance processing") is explained with reference to FIG. 6 to FIG. 8. FIG. 6 is a perspective view of the shovel 100 that is a perspective view of the shovel 100 that is performing a finishing task of a down-sloped surface. FIG. 7 is a flowchart illustrating first assistance processing. FIG. 8 is an example of configuration of a first assistance screen displayed on the display unit of the display device D1 when the first assistance processing is performed.

As illustrated in FIG. 6, the operator of the shovel 100 performs finishing of a sloped surface by alternately executing: a finishing task for moving a sloped surface bucket 6S from a bottom FS of the sloped surface to a top TS of the sloped surface along the designed surface; and a traveling task for moving the lower traveling body 1 by a predetermined distance in the direction indicated by an arrow AR.

Specifically, the finishing task includes: a task for excavating the sloped surface, as the excavation target surface, with the claw tip of the sloped surface bucket 6S; a task for making the sloped surface, as the excavation target surface, while pressing the sloped surface with the back surface of the sloped surface bucket 6S; and a task for excavating the excavation target surface while pressing the sloped surface, as the excavation target surface, with the back surface of the sloped surface bucket 6S; and the like.

A strip-shaped area SW is an area (a finished surface) on a sloped surface finished by a single finishing task. In the present embodiment, the strip-shaped area SW has substantially the same width as the sloped surface bucket 6S. A strip-shaped area SW0 is an incomplete area that is to be finished by the current finishing task. A strip-shaped area SW1 is an area that has already been finished by the previous finishing task (one time ago). A strip-shaped area SW2 is an area that has already been finished by the finishing task before the previous finishing task (two times ago). Strip-shaped areas SW3 to SW10 are areas that have been similarly made. In FIG. 6, an area indicated by a dot pattern indicates a sloped surface portion in which the finishing has been completed, and an area indicated by a cross pattern indicates a sloped surface portion in which the finishing has not been completed.

The target trajectory is configured to match the designed surface during the finishing task. Therefore, the shovel 100 controls the trajectory of the actual working portion so that the trajectory fits within a predetermined allowable error range with respect to the designed surface. However, even if the shovel 100 can continue the construction so that the trajectory of the working portion actually fits within the predetermined allowable error range, a level difference LD may occur between two adjacent strip-shaped areas. For example, a level difference LD6, as the level difference LD, in FIG. 6 is the level difference between the strip-shaped area SW5 and the strip-shaped area SW6. Even if each of the constructed strip-shaped area SW is within the allowable range, when the level difference LD is large, problems may occur, for example, a concrete block may lift up when the concrete block is placed on the sloped surface.

In the present embodiment, the controller 30 executes first assistance processing when the autonomous control unit 30C causes the back surface of the bucket 6 to be positioned at the bottom FS of the sloped surface.

First, the controller 30 calculates the difference between the surface of the strip-shaped area SW1 formed by the previous finishing task and the designed surface (step ST1). For example, in the example of FIG. 6, the controller 30 calculates a difference DS1 between the surface of the strip-shaped area SW1 formed by the previous finishing task and the designed surface (see FIG. 8).

For example, the controller 30 derives a difference DS1 between the surface of the strip-shaped area SW1 and the designed surface in the direction perpendicular to the designed surface on the basis of the trajectory of the working portion of the attachment when the strip-shaped area SW1 is finished. In this case, the controller 30 derives the difference DS1 between the surface of the strip-shaped area SW1 and the designed surface in the direction perpendicular to the designed surface on the basis of the output of the spatial recognition device 70 and the output of the positioning device 73. For example, the working portion of the attachment is the claw tip of the sloped surface bucket 6S or the back surface of the sloped surface bucket 6S.

Thereafter, the controller 30 calculates the difference between the surface (an estimated surface) of the strip-shaped area SW0 formed by the current finishing task and the designed surface (step ST2). For example, in the example of FIG. 6, the controller 30 estimates a difference DS0 between the estimated surface of the strip-shaped area SW0 formed by the current finishing task and the designed surface.

For example, the claw tip of the sloped surface bucket 6S is moved to the top of the sloped surface, as the excavation target surface, a manual operation by the operator or an autonomous control during the finishing task. Then, when the claw tip of the sloped surface bucket 6S is moved to the top of the sloped surface, the controller 30 derives the difference DS0 between the estimated surface of the incomplete strip-shaped area SW0 and the designed surface in the direction perpendicular to the designed surface on the basis of the coordinate point of the claw tip of the sloped surface bucket 6S calculated by the position calculation unit 30A. Specifically, the controller 30 derives the difference DS0 between the estimated surface of the incomplete strip-shaped area SW0 and the designed surface, based on the assumption that the current coordinate point of the claw tip of the sloped surface bucket 6S is a coordinate point on the estimated surface of the incomplete strip-shaped area SW0. In this case, the controller 30 may derive the difference DS0 between the estimated surface of the incomplete strip-shaped area SW0 and the designed surface, based on the assumption that the coordinate point of the tangent point between the current back surface of the sloped surface bucket 6S and the sloped surface, as the excavation target surface, is a coordinate point on the estimated surface of the incomplete strip-shaped area SW0.

Thereafter, the controller 30 determines whether the magnitude of the level difference is more than a predetermined value (step ST3).

For example, the controller 30 derives a magnitude HT1 of a level difference LD1 between the strip-shaped area SW0 and the strip-shaped area SW1 on the basis of the difference DS1 between the already-formed surface of the strip-shaped area SW1 and the designed surface and the difference DS0 between the estimated surface of the strip-shaped area SW0 that has not yet been formed and the designed surface. Specifically, the controller 30 derives, as the magnitude HT1 of the level difference LD1, the difference between the surface of the strip-shaped area SW1 and the estimated surface of the strip-shaped area SW0.

Then, the controller 30 determines whether the magnitude HT1 of the level difference LD1 is more than the predetermined value TH1. For example, the predetermined value TH1 is a value stored in advance in a non-volatile storage device, and is typically several millimeters (for example, 5 mm). The predetermined value TH1 may be zero.

In a case where the magnitude HT1 of the level difference LD1 is more than the predetermined value TH1 (YES in step ST3), the controller 30 sends a notification that the magnitude HT1 of the level difference LD1 is more than the predetermined value TH1 (step ST4).

For example, the controller 30 sends a notification that there is a possibility that the magnitude HT1 of the level difference LD1 between the already-formed surface of the strip-shaped area SW1 and the estimated surface of the strip-shaped area SW0 that has not yet been formed becomes more than the predetermined value TH1. Specifically, the controller 30 causes an audio message, "the height of the bucket will be adjusted because there is a possibility that the level difference may become excessive", to be output through the audio output device D2, and/or causes a similar message to be displayed on the display unit of the display device D1.

Thereafter, the controller 30 changes the target related to the autonomous control (step ST5). For example, the target related to the autonomous control is a target trajectory. For example, in a case where the surface of the strip-shaped area SW1 is higher than the estimated surface of the strip-shaped area SW0 and the magnitude HT1 of the level difference LD1 is more than the predetermined value TH1 by a value DF, i.e., HT1=TH1+DF, the controller 30 changes the target trajectory so that the target trajectory is higher than the designed surface by at least the value DF. This is to cause the magnitude HT1 of the level difference LD1 to be equal to or less than the predetermined value TH1. The controller 30 may change the target trajectory so that the surface of the strip-shaped area SW1 and the surface of the strip-shaped area SW0 are flush with each other. Thereafter, the controller 30 causes the shovel 100 to autonomously operate so that the predetermined portion of the attachment moves along the newly set target trajectory.

In this manner, the controller 30 changes the target trajectory so that the position of the estimated surface of the strip-shaped area SW0 with respect to the designed surface is within a predetermined allowable range and the magnitude HT1 of the level difference LD1 becomes equal to or less than the predetermined value TH1. For example, the predetermined allowable range is ±30 mm with respect to the designed surface.

In a case where the magnitude HT1 of the level difference LD1 is determined to be equal to or less than the predetermined value TH1 (NO in step ST3), the controller 30 ends the current first assistance processing without changing the target related to the autonomous control.

FIG. 8 illustrates an example of configuration of a first assistance screen displayed on the display unit of the display device D1 when the sloped surface bucket 6S is positioned at the bottom FS of the sloped surface in order to complete the strip-shaped area SW0.

The first assistance screen includes a cross-sectional display area G1, a surface display area G2, and a message display area G3.

The cross-sectional display area G1 is an area for displaying a cross section of the sloped surface. In the present embodiment, the cross-sectional display area G1 shows the cross section of the sloped surface in a virtual plane perpendicular to the sloped surface including the long dashed short dashed line LN1 of FIG. 6.

Image portions GL1 to GL6 are portions of solid lines LS indicating unevenness of the sloped surface, and indicate the sizes of the level differences LD1 to LD6, respectively. The image portion GL2 indicates that the magnitude of a level difference LD2 is substantially zero, specifically, indicates that the surface of the strip-shaped area SW1 and the surface of the strip-shaped area SW2 are substantially flush with each other.

The thick solid line L0 indicates the position of the designed surface. The dashed line L1 indicates the allowable upper limit position of the finished surface (for example, +30 mm with respect to the designed surface). The dashed line L2 indicates the allowable lower limit position of the finished surface (for example, -30 mm with respect to the designed surface). Specifically, the finished surface is treated as acceptable when the position with respect to the designed surface is equal to or less than the allowable upper limit position and is equal to or more than the allowable lower limit position.

By seeing the cross-sectional display area G1, the operator of the shovel 100 can readily ascertain that the distance between the designed surface and the surface of the strip-shaped area SW1 is DS1, the distance between the designed surface and the estimated surface of the strip-shaped area SW0 is DS0, the magnitude of the level difference LD1 between the surface of the strip-shaped area SW1 and the estimated surface of the strip-shaped area SW0 is HT1, and the magnitude HT1 of the level difference LD1 is more than the predetermined value TH1. In the present embodiment, dashed line arrows pointing to DS0, DS1, DS2, HT1, and TH1 are given for the sake of explanation, and are not actually displayed. However, the display device D1 may display auxiliary figures such as these dashed line arrows.

The surface display area G2 is an area that displays the level difference of the surface of each strip-shaped area that constitutes the sloped surface, and indicates the state of each strip-shaped area as seen from above. In the present embodiment, the surface display area G2 indicates the level difference of the surface of each strip-shaped area with multiple colors.

An image portion GS0 indicates, with a first color (cross pattern), that the difference between the estimated surface of the incomplete strip-shaped area SW0 that is to be finished by the current finishing task and the designed surface is DS0.

An image portion GS1 indicates, with a second color (coarse dot pattern), that the difference between the surface of the strip-shaped area SW1 that has been finished by the previous finishing task and the designed surface is DS1.

An image portion GS2 indicates, with the second color (coarse dot pattern), that the difference between the surface of the strip-shaped area SW2 that has been finished by the finishing task of 2 times ago and the designed surface is DS1, which is the same as in the strip-shaped area SW1.

An image portion GS3 indicates, with a third color (fine dot pattern), that the difference between the surface of the strip-shaped area SW3 that has been finished by the finishing task of 3 times ago and the designed surface is DS2.

An image portion GS4 indicates, with the first color (cross pattern), that the difference between the surface of the strip-shaped area SW4 that has been finished by the finishing task of 4 times ago and the designed surface is DS0, which is the same as in the strip-shaped area SW0.

An image portion GS5 indicates, with the third color (fine dot pattern), that the difference between the surface of the strip-shaped area SW5 that has been finished by the finishing task of 5 times ago and the designed surface is DS2, which is the same as in the strip-shaped area SW3.

An image portion GS6 indicates, with the second color (coarse dot pattern), that the difference between the surface of the strip-shaped area SW6 that has, been finished by the finishing task of 6 times ago and the designed surface is DS1, which is the same as in the strip-shaped area SW1.

In the example of FIG. 8, the image portion GS0 corresponding to the strip-shaped area SW0 of which the finishing has not been completed is surrounded by a thick line frame FR1 and is indicated with a figure GB in order to distinguish from the image portions GS1 to GS6 corresponding to the strip-shaped areas SW1 to SW6, respectively, of which the finishing has been completed. The figure GB is a figure indicating the sloped surface bucket 6S, and indicates the current position of the sloped surface bucket 6S.

The image portion GSx indicates, with a fourth color (white color), that it is an area that has not yet been reached by the shovel 100.

By seeing the surface display area G2, the operator of the shovel 100 can readily ascertain the height, with respect to the designed surface, of the surface of each of the strip-shaped areas SW1 to SW6 of which the finishing has already been completed, i.e., the unevenness of the sloped surface. In addition, the operator of the shovel 100 can compare the height, with respect to the designed surface, of the estimated surface of the strip-shaped area SW0 of which the finishing has not been completed, with the height, with respect to the designed surface, of the surface of each of the strip-shaped areas SW1 to SW6.

The message display area G3 is an area for displaying a message generated by the controller 30. In the example of FIG. 8, in the message display area G3, a message generated by the controller 30 is displayed. The message is displayed when the controller 30 determines that there is a possibility that the magnitude HT1 of the level difference LD1 between the surface of the strip-shaped area SW1 and the estimated surface of the strip-shaped area SW0 may become more than the predetermined value TH1.

By seeing the message displayed in the message display area G3, the operator of the shovel 100 can recognize that the height of the sloped surface bucket 6S is autonomously adjusted upward so that the magnitude HT1 of the level difference LD1 becomes equal to or less than the predetermined value TH1. However, the controller 30 may autonomously adjust the height of the sloped surface bucket 6S without letting the operator recognize that the height of the sloped surface bucket 6S is autonomously adjusted.

Figure 9:
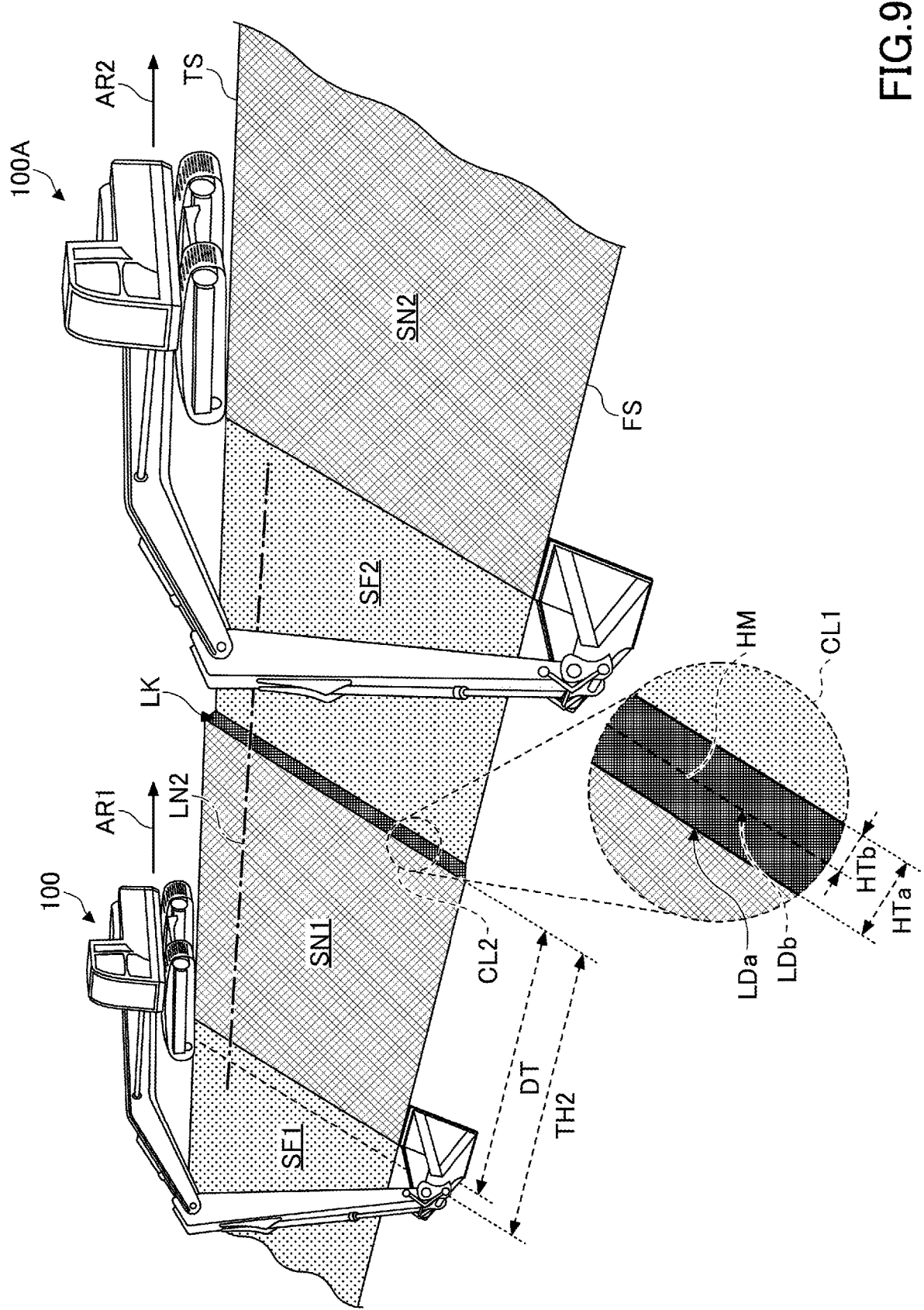
FIG. 9 is a perspective view of two shovels executing a finishing task of a down-sloped surface.
Figure 10:
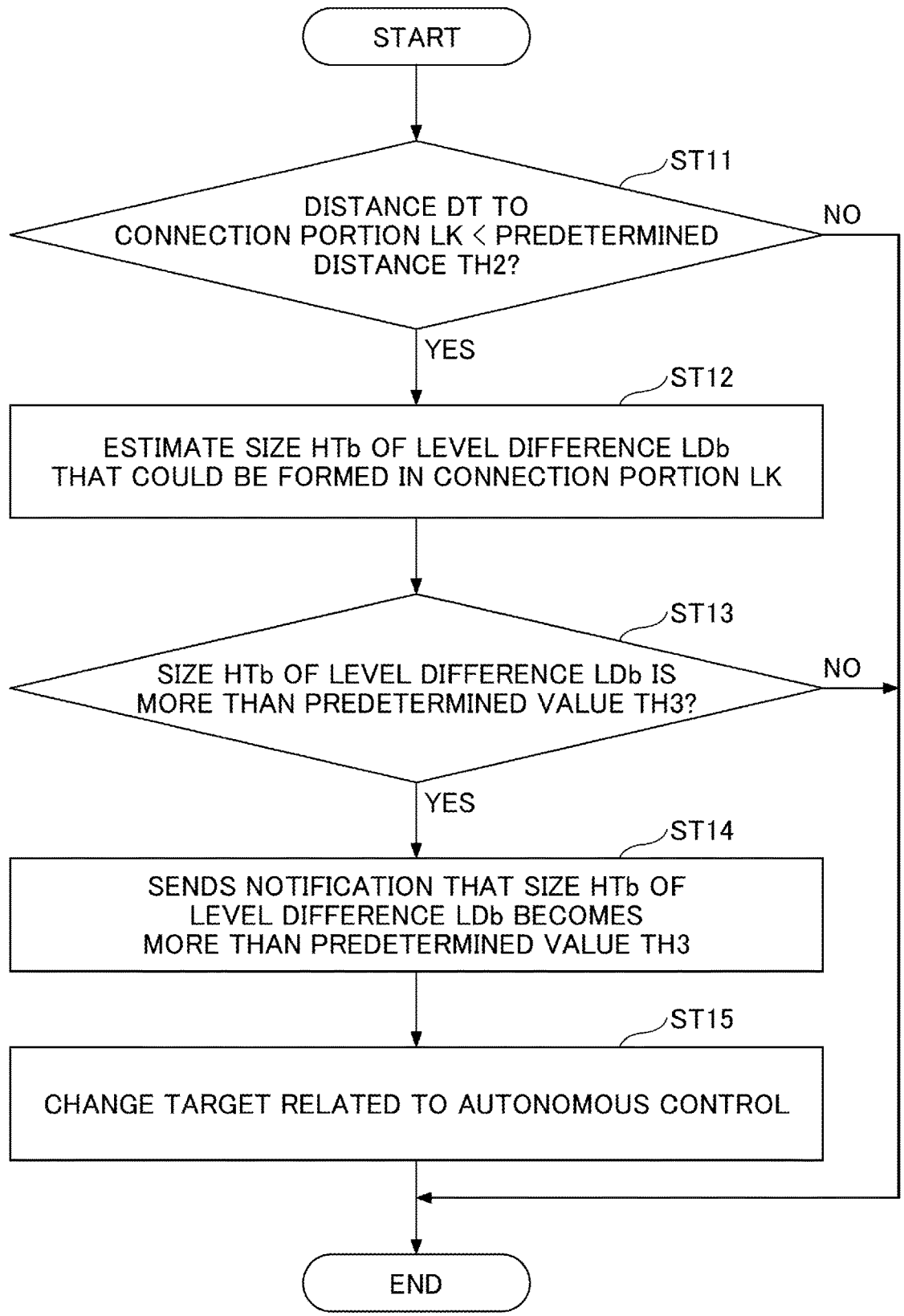
FIG. 10 is a flowchart illustrating second assistance processing.
Figure 11:
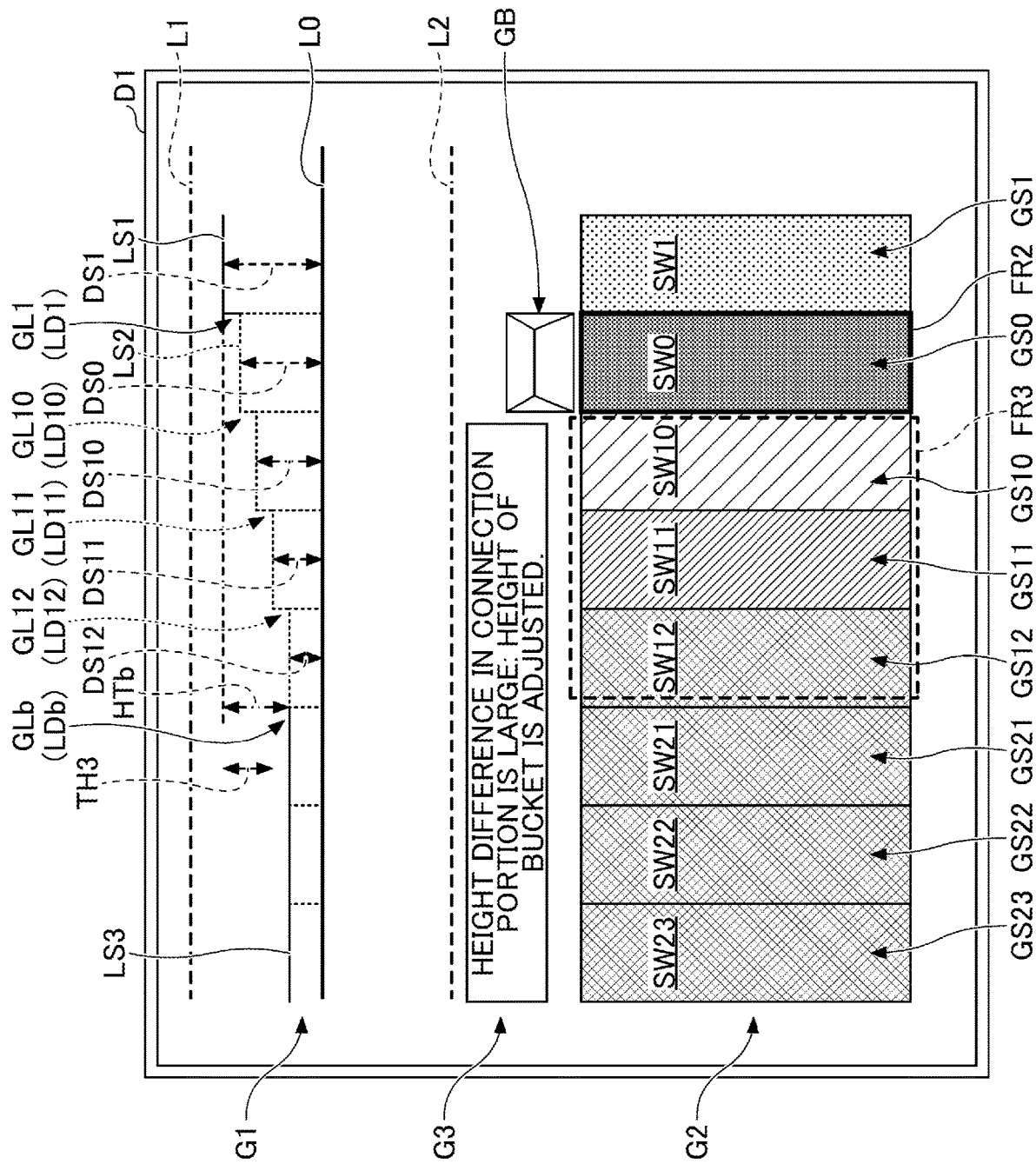
FIG. 11 is an example of configuration of a second assistance screen.

Next, another processing (hereinafter referred to as "second assistance processing") in which the controller 30 assists an operator's sloped surface finishing task is explained with reference to FIG. 9 to FIG. 11. FIG. 9 is a perspective view of the shovel 100 and a shovel 100A that are performing a finishing task of a down-sloped surface. FIG. 10 is a flowchart illustrating the second assistance processing. FIG. 11 illustrates an example of configuration of the second assistance screen displayed on the display unit of the display device D1 when the second assistance processing is performed.

As illustrated in FIG. 9, the operator of the shovel 100 performs finishing of the sloped surface by alternately executing: a finishing task for moving the sloped surface bucket 6S from the bottom FS of the sloped surface to the top TS of the sloped surface along the designed surface; and a traveling task for moving the lower traveling body 1 by a predetermined distance in the direction indicated by an arrow AR1.

Likewise, the operator of the shovel 100A performs finishing of the sloped surface by alternately executing: a finishing task for moving the sloped surface bucket 6S from the bottom FS of the sloped surface to the top TS of the sloped surface along the designed surface; and a traveling task for moving the lower traveling body 1 by a predetermined distance in the direction indicated by an arrow AR2. In the present embodiment, the shovel 100A has a configuration similar to the shovel 100. However, the shovel 100A may include a controller that does not include functional elements such as the position calculation unit 30A, the trajectory obtaining unit 30B, the autonomous control unit 30C, and the like.

In a manner similar to FIG. 6, the operator of the shovel 100 and the operator of the shovel 100A continue to perform the finishing task of the sloped surface while forming the strip-shaped area SW. In a manner similar to FIG. 6, in FIG. 9, an area indicated by a dot pattern indicates a sloped surface portion of which finishing has been completed, and an area indicated by a cross pattern indicates a sloped surface portion of which the finishing has not been completed. Specifically, the area indicated by the dot pattern includes a sloped surface portion SF1 of which the finishing has been completed by the shovel 100 and a sloped surface portion SF2 of which the finishing has been completed by the shovel 100A. The area indicated by the cross pattern includes a sloped surface portion SN1 of which the finishing has not been completed by the shovel 100 and a sloped surface portion SN2 of which the finishing has not been completed by the shovel 100A. A connection portion LK is a portion where the sloped surface portion SN1 of which the finishing has not been completed by the shovel 100 is in contact with the sloped surface portion SF2 of which the finishing has been completed by the shovel 100A, i.e., a portion where the sloped surface portion SF1 and the sloped surface portion SF2 are connected in the future.

A drawing of a portion enclosed by a dashed line circle CL1 is an enlarged view of a portion enclosed by a dashed line circle CL2. This enlarged view indicates a level difference LDa between the sloped surface portion SN1 and the sloped surface portion SF2, i.e., the current magnitude of the level difference LDa in the connection portion LK, is HTa.

In the present embodiment, while the shovel 100 is operating, the controller 30 provided in the shovel 100 repeatedly executes the second assistance processing with a predetermined control cycle.

First, the controller 30 determines whether the distance DT to the connection portion LK has decreased to less than a predetermined distance TH2 (step ST11). For example, in the example of FIG. 9, the controller 30 determines whether a distance DT between the sloped surface portion SF1 and the connection portion LK in the direction in which the sloped surface extends has decreased to less than the predetermined distance TH2. For example, the predetermined distance TH2 is a distance stored in advance in a non-volatile storage device, and is typically several meters (for example, 5 meters).

For example, the controller 30 derives the distance DT on the basis of the output of the spatial recognition device 70. Alternatively, the controller 30 may derive the distance DT on the basis of the output of the positioning device 73 and information about the position of the sloped surface portion SF2 obtained from the shovel 100A through a communication device. The information about the position of the sloped surface portion SF2 may be information measured by a measurement device carried by a worker who works around the shovel 100 or information obtained by a spatial recognition device provided in a flying vehicle such as a drone.

In a case where the distance DT is determined to be less than the predetermined distance TH2 (YES in step ST11), the controller 30 estimates a size HTb of a level difference LDb that could be formed in the connection portion LK (step ST12).

Specifically, the controller 30 estimates the size HTb of the level difference LDb that is formed when the sloped surface portion SF1 and the sloped surface portion SF2 are connected by the connection portion LK, on the basis of at least one of the output of the spatial recognition device 70, information about the position of the working portion of the attachment, the output of the positioning device 73, and information about the position of the sloped surface portion SF2 obtained from the shovel 100A through the communication device, and the like. In the dashed line circle CL1 of FIG. 9, a dashed line HM indicates the position of the estimated surface of the sloped surface portion SF1 when the sloped surface portion SF1 and the sloped surface portion SF2 are connected by the connection portion LK.

For example, the controller 30 estimates a height HTb on the basis of the difference DS1 (see FIG. 11) between the surface of the sloped surface portion SF1 and the designed surface at the current point in time, i.e., at the point in time when the sloped surface portion SF1 and the sloped surface portion SF2 have not yet been connected by the connection portion LK. A height DS1 is the difference between the surface of the strip-shaped area SW1 formed by the previous finishing task and the designed surface. Specifically, the controller 30 derives the height DS1, as the difference between the surface of the strip-shaped area SW1 and the designed surface in the direction perpendicular to the designed surface, on the basis of the trajectory of the working portion of the attachment when the strip-shaped area SW1 is finished by the previous finishing task. In this case, the controller 30 may derive the height DS1, as the difference between the surface of the strip-shaped area SW1 and the designed surface in the direction perpendicular to the designed surface, on the basis of the output of the spatial recognition device 70 and the output of the positioning device 73. For example, the working portion of the attachment is the claw tip of the sloped surface bucket 6S or the back surface of the sloped surface bucket 6S.

Thereafter, the controller 30 determines whether the size HTb of the level difference LDb is more than the predetermined value TH3 (step ST13). For example, the predetermined value TH3 is a value stored in advance in a non-volatile storage device, and is typically several millimeters (for example, 5 mm). The predetermined value TH3 may be zero.

In a case where the size HTb of the level difference LDb is determined to be more than the predetermined value TH3 (YES in step ST13), the controller 30 sends a notification that the size HTb of the level difference LDb becomes more than the predetermined value TH3 (step ST14).

For example, the controller 30 sends a notification that there is a possibility that the size HTb of the level difference LDb formed in the connection portion LK may become more than the predetermined value TH3 when formation of the sloped surface portion SF1 is continued without any change. Specifically, the controller 30 causes an audio message, "the height of the bucket will be adjusted because there is a possibility that the level difference may become excessive in the connection portion", to be output through the audio output device D2, and/or causes a similar message to be displayed on the display unit of the display device D1.

Thereafter, the controller 30 changes the target related to the autonomous control (step ST15). In the example of FIG. 9, the controller 30 determines the difference between the estimated surface of each strip-shaped area finished up to the connection portion LK and the designed surface.

Specifically, the controller 30 determines that the sloped surface portion SF1 and the sloped surface portion SF2 were connected via the connection portion LK when the fourth finishing task including the incomplete strip-shaped area SW0 that is to be finished by the current finishing task was performed.

As illustrated in FIG. 11, the incomplete strip-shaped area SW0 that is to be finished by the four finishing tasks includes strip-shaped areas SW0, SW10, SW11, and SW12.

Then, the controller 30 determines the difference between the estimated surface and the designed surface of each of the four strip-shaped areas so that all of the sizes of the five level differences related to these four strip-shaped areas are equal to or less than the predetermined value TH3. As illustrated in FIG. 11, the five level differences include: a level difference LD1 formed between the strip-shaped area SW1 and the strip-shaped area SW0; a level difference LD10 formed between the strip-shaped area SW0 and a strip-shaped area SW10; a level difference LD11 formed between the strip-shaped area SWIG and a strip-shaped area SW11; a level difference LD12 formed between the strip-shaped area SW11 and a strip-shaped area SW12; and a level difference LDb formed between the strip-shaped area SW12 and a strip-shaped area SW21.

In the example of FIG. 9, the controller 30 determines the difference between (i) the estimated surface of each of the four strip-shaped areas SW0 and SW10 to SW12 and (ii) the designed surface, so that the magnitude of the level difference LDb formed between the strip-shaped area SW12 and the strip-shaped area SW21 becomes zero, and all of the remaining four level differences LD1 and LD10 to LD12 are minimized and become the same size.

Thereafter, the controller 30 changes the target related to the autonomous control. For example, the target related to the autonomous control is a target trajectory. For example, the controller 30 changes the target trajectory, on the basis of the difference between (i) the estimated surface of each of the four strip-shaped areas SW0 and SW10 to SW12 and (ii) the designed surface.

Specifically, when the strip-shaped area SW0 is finished, the controller 30 changes the target trajectory so that the target trajectory becomes lower than the designed surface by the magnitude of the level difference LD1, i.e., the difference between the surface of the strip-shaped area SW1 and the estimated surface of the strip-shaped area SW0. Thereafter, the controller 30 causes the shovel 100 to autonomously operate so that the predetermined portion of the attachment moves along the newly set target trajectory.

Also, when the strip-shaped area SW10 is finished, the controller 30 changes the target trajectory so that the target trajectory becomes still lower than the designed surface by the magnitude of the level difference LD10, i.e., the difference between the surface of the strip-shaped area SW0 and the estimated surface of the strip-shaped area SW10. The is also applicable to finishing of the strip-shaped area SW11 and the strip-shaped area SW12.

It should be noted that the controller 30 may determine the difference between (i) the estimated surface of each of the four strip-shaped areas SW0 and SW10 to SW12 and (ii) the designed surface, so that the magnitude of the level difference LDb formed between the strip-shaped area SW12 and the strip-shaped area SW21 becomes zero, and the sizes of the remaining four level differences LD1 and LD10 to LD12 become different from one another. Alternatively, the controller 30 may determine the difference between (i) the estimated surface of each of the four strip-shaped areas SW0 and SW10 to SW12 and (ii) the designed surface, so that all of the five level differences are minimized and become the same size.

As described above, the controller 30 changes the target trajectory, so that all of the positions of the surfaces of the six strip-shaped areas SW1, SW0, SW10 to SW12 and SW21 fall within a predetermined allowable range, and all of the sizes of the five level differences LD1, LD10 to LD12 and LDb related to the six strip-shaped areas become equal to or less than the predetermined value TH3. For example, the predetermined allowable range is ±30 mm with respect to the designed surface.

In a case where the distance DT to the connection portion LK is determined to be equal to or more than the predetermined distance TH2 (NO in step ST11), or the size HTb of the level difference LDb is determined to be equal to or less than the predetermined value TH3 (NO in step ST13), the controller 30 ends the current second assistance processing without changing the target related to the autonomous control.

FIG. 11 is a second assistance screen displayed on the display unit of the display device D1 provided in the shovel 100 when the sloped surface bucket 6S is positioned at the bottom FS of the sloped surface in order to complete the strip-shaped area SW0.

Like the first assistance screen, the second assistance screen includes a cross-sectional display area G1, a surface display area G2, and a message display area G3.

The cross-sectional display area G1 is an area for displaying a cross section of the sloped surface. In FIG. 11, the cross-sectional display area G1 shows the cross section of the sloped surface in a virtual plane perpendicular to the sloped surface including the long dashed short dashed line LN2 of FIG. 9.

An image portion GL1 is a portion of a solid line LS1 indicating unevenness of the sloped surface formed by the shovel 100, and indicates the magnitude of the level difference LD1.

Image portions GL10 to GL12 are portions of a dashed line LS2 indicating unevenness of the sloped surface formed by the finishing task that is performed thereafter, and indicate the sizes of the level differences LD10 to LD12.

An image portion GLb is a portion of a solid line LS3 indicating unevenness of the sloped surface formed by the shovel 100A, and indicates a magnitude of the level difference LDb formed by the finishing task that is performed thereafter. In the example of FIG. 11, the image portion GLb indicates that the magnitude of the level difference LDb becomes substantially zero, specifically, indicates that the surface of the strip-shaped area SW12 and the surface of the strip-shaped area SW21 are substantially flush with each other.

The thick solid line L0 indicates the position of the designed surface. The dashed line L1 indicates the allowable upper limit position of the finished surface (for example, +30 mm with respect to the designed surface). The dashed line L2 indicates the allowable lower limit position of the finished surface (for example, −30 mm with respect to the designed surface).

By seeing the cross-sectional display area G1, the operator of the shovel 100 can readily ascertain that: the distance between the designed surface and the surface of the strip-shaped area SW1 is DS1; the distance between the designed surface and the estimated surface of the strip-shaped area SW0 is DS0; the magnitude of the level difference LD1 between the surface of the strip-shaped area SW1 and the estimated surface of the strip-shaped area SW0, the magnitude of the level difference LD10 between the estimated surface of the strip-shaped area SW0 and the estimated surface of the strip-shaped area SW10, the magnitude of the level difference LD11 between the estimated surface of the strip-shaped area SW10 and the estimated surface of the strip-shaped area SW11, and the magnitude of the level difference LD12 between the estimated surface of the strip-shaped area SW11 and the estimated surface of the strip-shaped area SW12 are substantially the same; and the magnitude of the level difference LDb formed between the estimated surface of the strip-shaped area SW12 and the surface of the strip-shaped area SW21 is substantially zero.

In the example of FIG. 11, dashed line arrows pointing to DS0, DS1, DS10 to DS12, HTb, and TH3 are given for the sake of explanation, and are not actually displayed. However, the display device D1 may display auxiliary figures such as these dashed line arrows.

The surface display area G2 is an area that displays the level difference of the surface of each strip-shaped area that constitutes the sloped surface, and indicates the state of each strip-shaped area as seen from above. In the present embodiment, the surface display area G2 indicates the level difference of the surface of each strip-shaped area with multiple colors.

An image portion GS0 indicates, with a first color (dot pattern), that the difference between the estimated surface of the incomplete strip-shaped area SW0 that is to be finished by the current finishing task and the designed surface is DS0.

An image portion GS1 indicates, with a second color (coarse dot pattern), that the difference between the surface of the strip-shaped area SW1 that has been finished by the previous finishing task and the designed surface is DS1.

An image portion GS10 indicates, with a third color (coarse diagonal line pattern), that the difference between the estimated surface of the incomplete strip-shaped area SW10 that is to be finished by a subsequent finishing task and the designed surface will be DS10 that is smaller than DS0.

An image portion GS11 indicates, with a fourth color (fine diagonal line pattern), that the difference between the estimated surface of the incomplete strip-shaped area SW11 that is to be finished by a finishing task subsequent to the subsequent finishing task (the second finishing task) and the designed surface will be DS11 that is smaller than DS10.

An image portion GS12 indicates, with a fifth color (cross pattern), that the difference between the estimated surface of the incomplete strip-shaped area SW12 that is to be finished by the finishing task of three times later (the third finishing task) and the designed surface is DS12 smaller than DS11.

Image portions GS21 to GS23 indicate, with a fifth color (cross pattern), that the difference between the surface of each of the strip-shaped areas SW21 to SW23 that have been finished by the finishing task by the shovel 100A and the designed surface is DS12 that is the same as the difference in the strip-shaped area SW12.

In the example of FIG. 11, the image portion GS0 corresponding to the strip-shaped area SW0 formed by the current finishing task performed by the shovel 100 is surrounded by a thick line frame FR2 and is indicated with a figure GB in order to distinguish from the image portions corresponding to other strip-shaped areas. The figure GB is a figure indicating the sloped surface bucket 6S, and indicates the current position of the sloped surface bucket 6S. In this case, for example, the image portions corresponding to other strip-shaped areas include: the image portion GS1 corresponding to the strip-shaped area SW1 of which the finishing has been completed by the shovel 100; the image portions GS21 to GS23 corresponding to the strip-shaped areas SW21 to SW23 of which the finishing has been completed by the shovel 100A; and the image portions GS10 to GS12 corresponding to the strip-shaped areas SW10 to SW12 of which the finishing task has not yet been started by the shovel 100.

The image portions GS10 to GS12 corresponding to the strip-shaped areas SW10 to SW12 of which the finishing task has not yet been started by the shovel 100 are enclosed by a dashed line frame FR3 in order to distinguish from other strip-shaped areas. In this case, for example, the image portion corresponding to another strip-shaped area includes: the image portion GS0 corresponding to the strip-shaped area SW0 formed by the current finishing task performed by the shovel 100; the image portion GS1 corresponding to the strip-shaped area SW1 of which the finishing has been completed by the shovel 100; and the image portions GS21 to GS23 corresponding to the strip-shaped areas SW21 to SW23 of which the finishing has been completed by the shovel 100A.

By seeing the surface display area G2, the operator of the shovel 100 can readily ascertain the height of the estimated surface of each of the strip-shaped areas SW0 and SW10 to SW12 that are to be finished by the four future finishing tasks including the current finishing task. In addition, the operator of the shovel 100 can ascertain that the sizes of the level differences LD1, LD10 to LD12 and LDb become equal to or less than the predetermined value TH3, i.e., the sloped surface finished by the shovel 100 and the sloped surface finished by the shovel 100A are connected smoothly.

The message display area G3 is an area for displaying a message generated by the controller 30. In the example of FIG. 11, the message display area G3 shows a message generated by the controller 30 when the controller 30 determines that the size HTb of the level difference LDb in the connection portion LK may become more than the predetermined value TH3.

By seeing the message displayed in the message display area G3, the operator of the shovel 100 can recognize that the height of the sloped surface bucket 6S is autonomously adjusted downward so that the size HTb of the level difference LDb becomes equal to or less than the predetermined value TH3, i.e., the height of the sloped surface bucket 6S is autonomously adjusted downward in a stepwise manner in the four future finishing tasks. However, the controller 30 may autonomously adjust the height of the sloped surface bucket 6S without letting the operator recognize that the height of the sloped surface bucket 6S is autonomously adjusted.

Figure 12A:
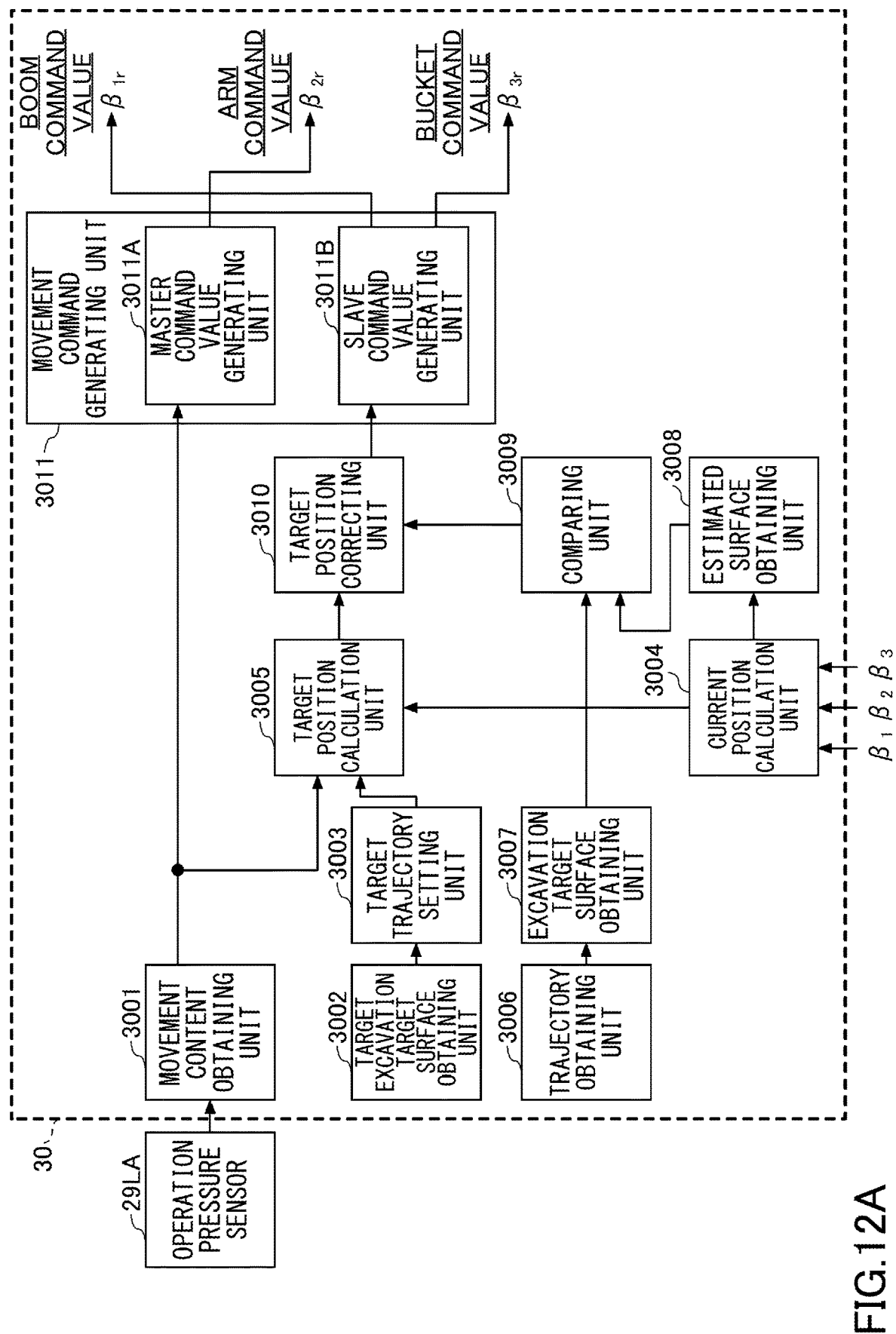
FIG. 12A is a functional block diagram illustrating an example of detailed configuration related to a machine control function of a shovel.
Figure 12B:
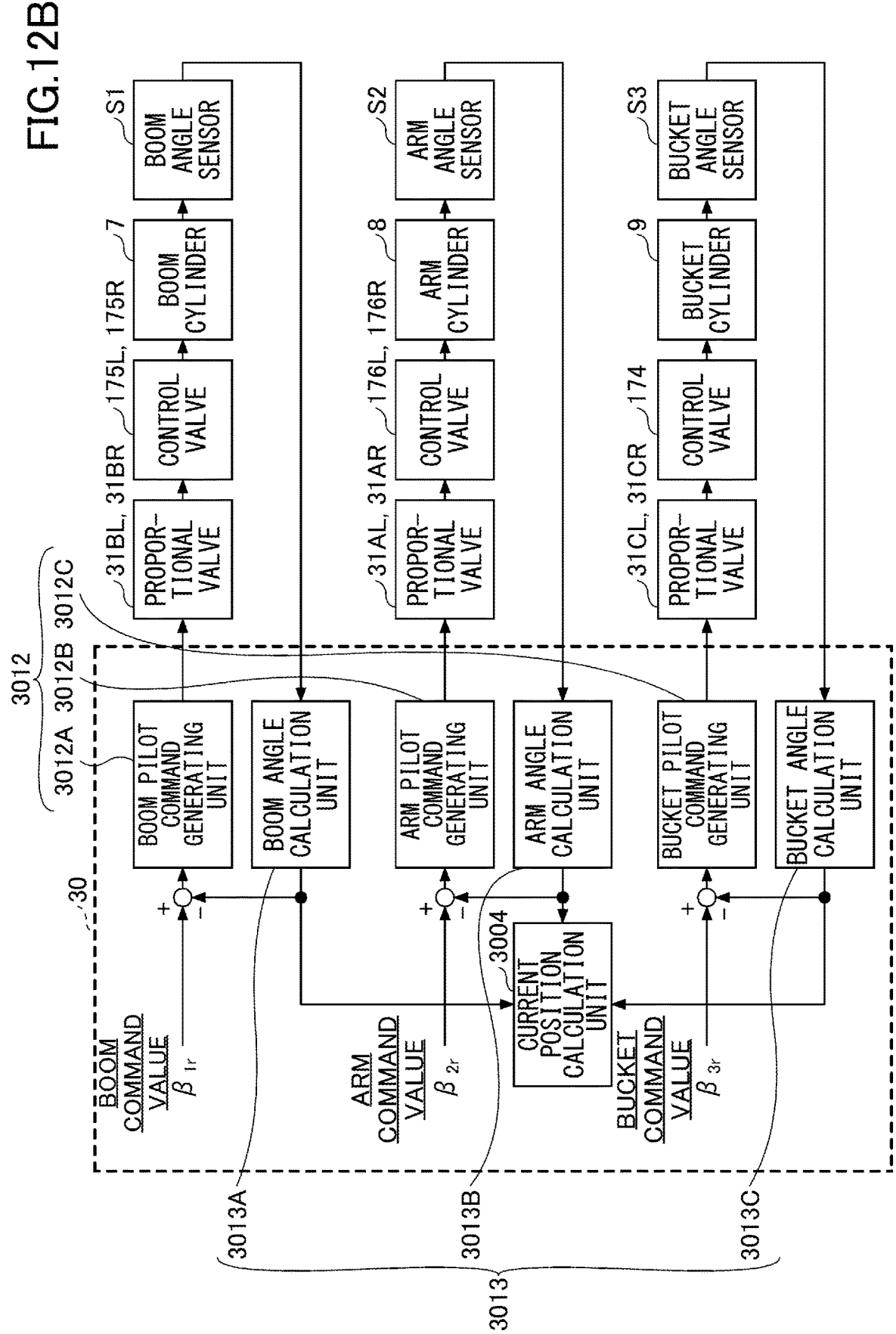
FIG. 12B is a functional block diagram illustrating an example of detailed configuration related to a machine control function of a shovel.

Next, an example of detailed configuration related to the machine control function is explained with reference to FIG. 12A and FIG. 12B. FIG. 12A and FIG. 12B are functional block diagrams illustrating an example of detailed configuration related to the machine control function of the shovel 100 according to the present embodiment.

The controller 30 includes, as the functional units related to the machine control function, a movement content obtaining unit 3001, a target excavation target surface obtaining unit 3002, a target trajectory setting unit 3003, a current position calculation unit 3004, a target position calculation unit 3005, a trajectory obtaining unit 3006, an excavation target surface obtaining unit 3007, an estimated surface obtaining unit 3008, a comparing unit 3009, a target position correcting unit 3010, a movement command generating unit 3011, a pilot command generating unit 3012, and an orientation angle calculation unit 3013. For example, in a case where the switch NS is pressed, these functional unit repeatedly execute an operation explained later with a predetermined control cycle.

The movement content obtaining unit 3001 obtains a movement content related to an operation (i.e., a tilt operation in the forward-and-backward direction) of the arm 5 with the left operation lever 26L, on the basis of a detection signal retrieved from the operation pressure sensor 29LA. For example, the movement content obtaining unit 3001 obtains (calculates), as a movement content, an operation direction (which of an arm opening operation and an arm closing operation is performed) and an operation amount.

For example, the target excavation target surface obtaining unit 3002 obtains data related to a target excavation target surface (designed surface) from an internal memory, a predetermined external storage device, or the like.

The target trajectory setting unit 3003 sets information about the target trajectory of the working portion for moving the working portion of the attachment along the designed surface on the basis of data related to the designed surface. For example, the target trajectory setting unit 3003 may set, as the information about the target trajectory, the inclination angle of the designed surface in the forward-and-backward direction with respect to the body (upper turning body 3) of the shovel 100.

The current position calculation unit 3004 calculates the position (the current position) of the working portion of the attachment. Specifically, the position of the working portion of the attachment may be calculated on the basis of a boom angle $\beta 1$, an arm angle $\beta 2$, and a bucket angle $\beta 3$ calculated by the orientation angle calculation unit 3013 explained later.

The target position calculation unit 3005 calculates the target position of the working portion of the attachment on the basis of the movement content (the operation direction and the operation amount) related to the operation of the arm 5 with the left operation lever 26L, information about the target trajectory that has been set, and the current position of the working portion of the attachment. The target position is a position on the designed surface (i.e., the target trajectory) that is to be reached in the current control cycle when the arm 5 is assumed to move according to the operation of the arm 5 with the left operation lever 26L direction and operation amount. For example, the target position calculation unit 3005 may calculate the target position of the working portion of the attachment using a map, an arithmetic expression, and the like stored in advance in a nonvolatile internal memory or the like.

For example, the trajectory obtaining unit 3006 obtains data related to the past trajectory of the working portion of the attachment from an internal memory, a predetermined external storage device, or the like.

The excavation target surface obtaining unit 3007 obtains data related to the surface of the strip-shaped area SW1 (related to FIG. 6), which is an area that has already been finished by the previous finishing task (one time ago), on the basis of the past trajectory of the working portion of the attachment obtained by the trajectory obtaining unit 3006.

The estimated surface obtaining unit 3008 obtains data related to the estimated surface of strip-shaped area SW0 (see FIG. 6), i.e., the incomplete area that is to be finished by the current finishing task, on the basis of the position of the working portion of the attachment (the current position) calculated by the current position calculation unit 3004.

The comparing unit 3009 compares the magnitude HT1 of the level difference LD1 between the surface of the strip-shaped area SW1 and the estimated surface of the strip-shaped area SW0 with the predetermined value TH1. For example, as illustrated in FIG. 8, the comparing unit 3009 derives the magnitude HT1 of the level difference LD1 between the strip-shaped area SW0 and the strip-shaped area SW1, on the basis of the difference DS1 between the already-formed surface of the strip-shaped area SW1 and the designed surface and the difference DS0 between the estimated surface of the strip-shaped area SW0 that has not yet been formed and the designed surface. Then, the comparing unit 3009 compares the magnitude HT1 of the level difference LD1 with the predetermined value TH1.

In a case where the comparing unit 3009 determines that the magnitude HT1 of the level difference LD1 is more than the predetermined value TH1, the target position correcting unit 3010 corrects the target position of the working portion of the attachment calculated by the target position calculation unit 3005. For example, in a case where the surface of the strip-shaped area SW1 is more than the estimated surface of the strip-shaped area SW0 and the magnitude HT1 of the level difference LD1 is more than the predetermined value TH1 by the value DF, i.e., HT1=TH1+DF, the target position correcting unit 3010 corrects the target position so that the target position becomes higher than the designed surface by at least the value DF. This is to cause the magnitude HT1 of the level difference LD1 to be equal to or less than the predetermined value TH1. The target position correcting unit 3010 may correct the target position so that the surface of the strip-shaped area SW1 and the surface of the strip-shaped area SW0 are flush with each other.

In a case where the comparing unit 3009 determines that the magnitude HT1 of the level difference LD1 is equal to or less than the predetermined value TH1, the target position correcting unit 3010 outputs the target position of the working portion of the attachment calculated by the target position calculation unit 3005 to the movement command generating unit 3011 with no change.

The movement command generating unit 3011 outputs a command value (hereinafter referred to as a "boom command value") $\beta 1r$ related to movement of the boom 4, a command value (hereinafter referred to as an "arm command value") $\beta 2r$ related to movement of the arm 5, and a command value (hereinafter referred to as a "bucket command value") $\beta 3r$ related to movement of the bucket 6, on the basis of the target position of the working portion of the attachment. For example, the boom command value $\beta 1r$, the arm command value $\beta 2r$, and the bucket command value $\beta 3r$ are the boom angle, the arm angle, and the bucket angle, respectively, when the working portion of the attachment reaches the target position. The movement command generating unit 3011 includes a master command value generating unit 3011A and a slave command value generating unit 3011B.

The boom command value, the arm command value, and the bucket command value may be an angular velocity or an angular acceleration of the boom 4, the arm 5, and the bucket 6 that is required by the working portion of the attachment to reach the target position.

The master command value generating unit 3011A generates a command value (hereinafter referred to as a "master command value") related to movement of a moving element (hereinafter referred to as a "master element") that moves in response to an operation input of the left operation lever 26L in the forward-and-backward direction from among moving elements (the boom 4, the arm 5, and the bucket 6) constituting the attachment AT. In the present embodiment, the master element is the arm 5, and the master command value generating unit 3011A generates the arm command value $\beta 2r$ and outputs the arm command value $\beta 2r$ to an arm pilot command generating unit 3012B explained later. Specifically, the master command value generating unit 3011A generates the arm command value $\beta 2r$ corresponding to the movement content (operation direction and operation amount) of the left operation lever 26L. For example, the master command value generating unit 3011A may generate and output the arm command value $\beta 2r$, on the basis of a predetermined map, an arithmetic expression, and the like for defining a relationship between the movement content of the left operation lever 26L and the arm command value $\beta 2r$.

In a case where the arm command value $\beta 2r$ that is output from the master command value generating unit 3011A is "0", the arm 5 moves according to operator's operation of the arm 5 with the operation apparatus 26, regardless of the control of the controller 30. The master command value generating unit 3011A may be omitted. As described above, the pilot pressure corresponding to the content of the forward-and-backward operation with the left operation lever 26L is applied to the pilot ports of the control valves 176L, 176R corresponding to the arm cylinder 8 for driving the arm 5 via the shuttle valves 32AL, 32AR.

The slave command value generating unit 3011B generates a command value (hereinafter referred to as a "slave command value") related to movement of a slave element that moves so that the working portion of the attachment moves along the designed surface in accordance with (in synchronization with) movement of the master element (the arm 5) among moving elements constituting the attachment AT. In the present embodiment, the slave element is the boom 4 and the bucket 6, and the slave command value generating unit 3011B generates the boom command value $\beta 1r$ and the bucket command value $\beta 3r$, and outputs the boom command value $\beta 1r$ and the bucket command value $\beta 3r$ to a boom pilot command generating unit 3012A and a bucket pilot command generating unit 3012C, respectively, explained later. Specifically, the slave command value generating unit 3011B generates the boom command value $\beta 1r$ and the bucket command value $\beta 3r$ so that at least one of the boom 4 and the bucket 6 moves in accordance with (in synchronization with) movement of the arm 5 corresponding to the arm command value $\beta 2r$ and that the working portion of the attachment reaches the target position (i.e., moves along the designed surface). Accordingly, the controller 30 can move the working portion of the attachment along the designed surface by moving the boom 4 and the bucket 6 of the attachment AT in accordance with (in synchronization with) movement of the arm 5 corresponding to the operation related to the arm 5 with the left operation lever 26L. In other words, the arm 5 (the arm cylinder 8) moves according to the operation input with the left operation lever 26L, and the movements of the boom 4 (the boom cylinder 7) and the bucket 6 (the bucket cylinder 9) are controlled in accordance with the movement of the arm 5 (the arm cylinder 8) so that the end portion of the attachment AT such as the claw tip of the bucket 6 moves along the designed surface.

The pilot command generating unit 3012 generates a command value (hereinafter referred to as a "pilot pressure command value") applied to the control valves 174 to 176 for achieving the boom angle, the arm angle, and the bucket angle corresponding to the boom command value $\beta 1r$, the arm command value $\beta 2r$, and the bucket command value $\beta 3r$. The pilot command generating unit 3012 includes a boom pilot command generating unit 3012A, an arm pilot command generating unit 3012B, and a bucket pilot command generating unit 3012C.

The boom pilot command generating unit 3012A generates a pilot pressure command value applied the control valves 175L, 175R corresponding to the boom cylinder 7 for driving the boom 4, on the basis of a deviation between the boom command value $\beta 1r$ and the calculation value (measurement value) of the current boom angle calculated by a boom angle calculation unit 3013A explained later. Then, the boom pilot command generating unit 3012A outputs a control electric current corresponding to the generated pilot pressure command value to the proportional valves 31BL, 31BR. Accordingly, as described above, the pilot pressures corresponding to the pilot pressure command value that are output from the proportional valves 31BL, 31BR are applied to the corresponding pilot ports of the control valves 175L, 175R via the shuttle valves 32BL, 32BR. Then, with the effect of the control valves 175L, 175R, the boom cylinder 7 moves, and the boom 4 moves so as to achieve the boom angle corresponding to the boom command value $\beta 1r$.

The arm pilot command generating unit 3012B generates a pilot pressure command value applied the control valves 176L, 176R corresponding to the arm cylinder 8 for driving the arm 5, on the basis of a deviation between the arm command value $\beta 2r$ and the calculation value (measurement value) of the current arm angle calculated by an arm angle calculation unit 3013B explained later. Then, the arm pilot command generating unit 3012B outputs the control electric current corresponding to the generated pilot pressure command value to the proportional valves 31AL, 31AR. Accordingly, as described above, the pilot pressures corresponding to the pilot pressure command value that are output from the proportional valves 31AL, 31AR are applied to the corresponding pilot ports of the control valves 176L, 176R via the shuttle valves 32AL, 32AR. Then, with the effect of the control valves 176L, 176R, the arm cylinder 8 moves, and the arm 5 moves so as to achieve the arm angle corresponding to the arm command value β2r.

The bucket pilot command generating unit 3012C generates a pilot pressure command value applied to the control valve 174 corresponding to the bucket cylinder 9 for driving the bucket 6 on the basis of deviation between the bucket command value β3r and the calculation value (measurement value) of the current bucket angle calculated by a bucket angle calculation unit 3013C explained later. Then, the bucket pilot command generating unit 3012C outputs a control electric current corresponding to the generated pilot pressure command value to the proportional valves 31CL, 31CR. Accordingly, as described above, the pilot pressures corresponding to the pilot pressure command value that are output from the proportional valves 31CL, 31CR are applied to the corresponding pilot port of the control valve 174 via the shuttle valves 32CL, 32CR. Then, with the effect of the control valve 174, the bucket cylinder 9 moves, and the bucket 6 moves so as to achieve the bucket angle corresponding to the bucket command value β3r.

The orientation angle calculation unit 3013 calculates (measures) the (current) boom angle β1, arm angle β2, and bucket angle β3, on the basis of the detection signals of the boom angle sensor S1, the arm angle sensor S2, and the bucket angle sensor S3. The orientation angle calculation unit 3013 includes a boom angle calculation unit 3013A, an arm angle calculation unit 3013B, and a bucket angle calculation unit 3013C.

The boom angle calculation unit 3013A calculates (measures) the boom angle β1 on the basis of the detection signal retrieved from the boom angle sensor S1. The arm angle calculation unit 3013B calculates (measures) the arm angle β2 on the basis of the detection signal retrieved from the arm angle sensor S2. The bucket angle calculation unit 3013C calculates (measures) the bucket angle β3 on the basis of the detection signal retrieved from the bucket angle sensor S3.

Figure 13:
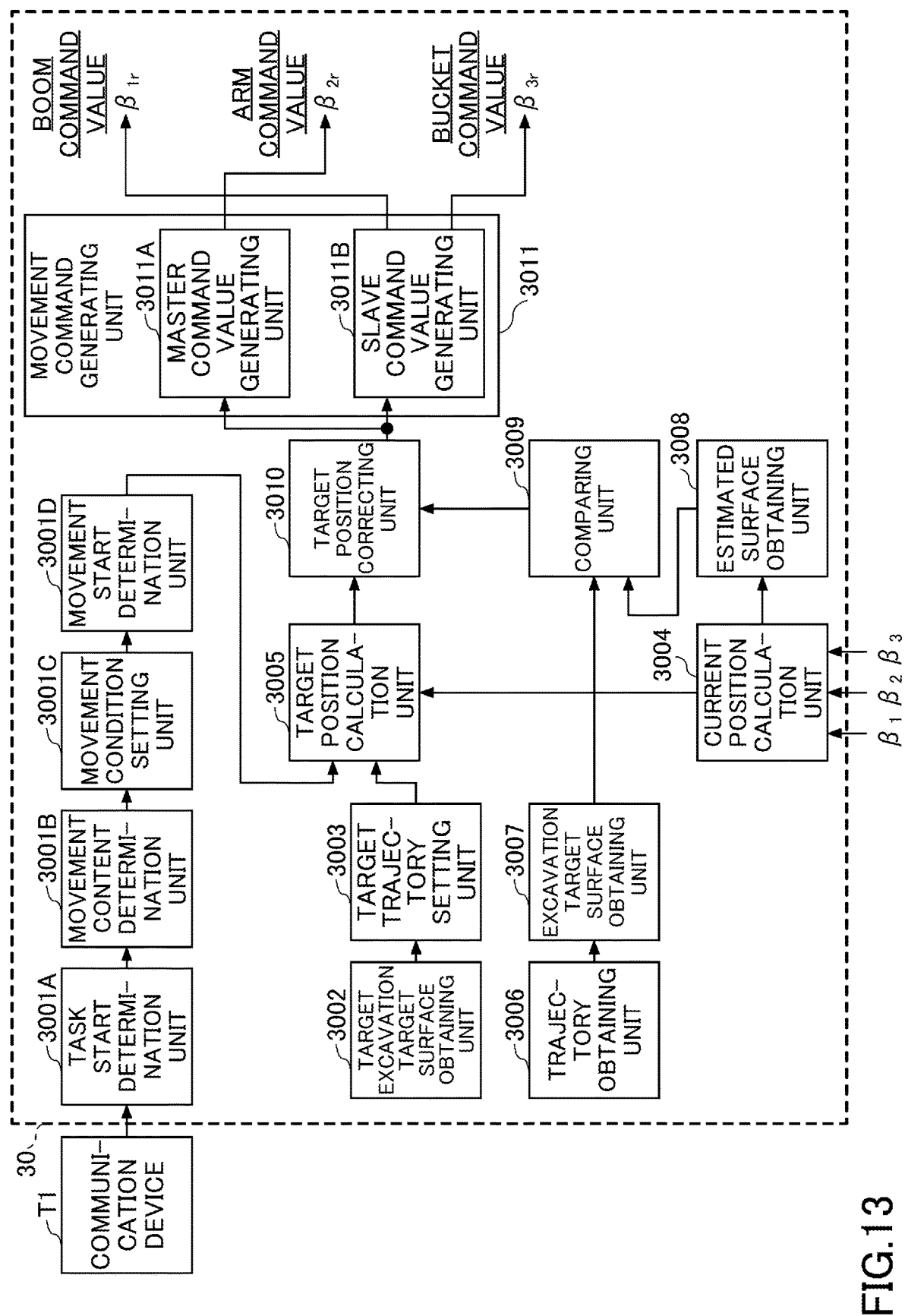
FIG. 13 is a functional block diagram illustrating another example of detailed configuration related to a machine control function of a shovel.

Next, another example of detailed configuration related to the machine control function is explained with reference to FIG. 13. FIG. 13 is a functional block diagram illustrating another example of detailed configuration related to the machine control function of the shovel 100 according to the present embodiment. In this example, a configuration corresponding to FIG. 12B is the same as the above example, and accordingly FIG. 12B is incorporated herein by reference. Hereinafter, features different from the above example (FIG. 12A) are mainly explained.

In this example, the shovel 100 includes a communication device T1, the controller 30 achieves an autonomous driving function in accordance with a signal received from the predetermined external device by the communication device T1.

The communication device T1 controls communication between the shovel 100 and the outside of the shovel 100. For example, the communication device T1 receives a command (hereinafter referred to as a "start command") indicating start of the autonomous driving function of the shovel 100 from the predetermined external device.

The controller 30 includes, as the functional units related to the machine control function, a task start determination unit 3001A, a movement content determination unit 3001B, a movement condition setting unit 3001C, a movement start determination unit 3001D, a target excavation target surface obtaining unit 3002, a target trajectory setting unit 3003, a current position calculation unit 3004, a target position calculation unit 3005, a trajectory obtaining unit 3006, an excavation target surface obtaining unit 3007, an estimated surface obtaining unit 3008, a comparing unit 3009, a target position correcting unit 3010, a movement command generating unit 3011, a pilot command generating unit 3012, and an orientation angle calculation unit 3013.

The task start determination unit 3001A determines the start of the predetermined task of the shovel 100. For example, the predetermined task is an excavation task and the like. For example, in a case where the task start determination unit 3001A receives an input of a start command from an external device through the communication device T1, the task start determination unit 3001A determines the start of the task designated by the start command. Also, in a case where the task start determination unit 3001A receives an input of a start command from an external device through the communication device T1, when the surroundings monitor function determines that a monitor target object does not exist in the monitor range around the shovel 100, the task start determination unit 3001A may determine the start of the task designated by the start command.

In a case where the task start determination unit 3001A determines the start of the task, the movement content determination unit 3001B determines the current movement content. For example, the movement content determination unit 3001B determines whether the shovel 100 is performing a movement corresponding to multiple movements constituting the predetermined task, on the basis of the current position of the working portion of the attachment. For example, multiple movements constituting the predetermined task include an excavation movement, a boom raising-and-turning movement, a soil discharge movement, a boom lowering turning movement, and the like, in a case where the predetermined task is an excavation task.

The movement condition setting unit 3001C sets a movement condition related to execution of the predetermined task by the autonomous driving function. For example, the movement condition includes a condition related to an excavation depth, an excavation length, and the like, in a case where the predetermined task is an excavation task.

The movement start determination unit 3001D determines the start of the predetermined movement constituting the predetermined task of which the start has been determined by the task start determination unit 3001A. For example, in a case where the movement content determination unit 3001B determines that the boom lowering turning movement has ended, and that the working portion of the attachment (the claw tip of the bucket 6) has reached the excavation start position, the movement start determination unit 3001D may determine that the excavation movement can be started. Then, when the movement start determination unit 3001D determines that the excavation movement can be started, an operation command of the moving element (the actuator) corresponding to the autonomous driving function generated according to the progress of the predetermined task is input to the target position calculation unit 3005. Accordingly, the target position calculation unit 3005 can calculate the target position of the working portion of the attachment according to the operation command corresponding to the autonomous driving function.

As described above, in this example, the controller 30 can cause the shovel 100 to execute a predetermined movement (for example, an excavation movement) on the basis of the autonomous driving function.

Figure 14:
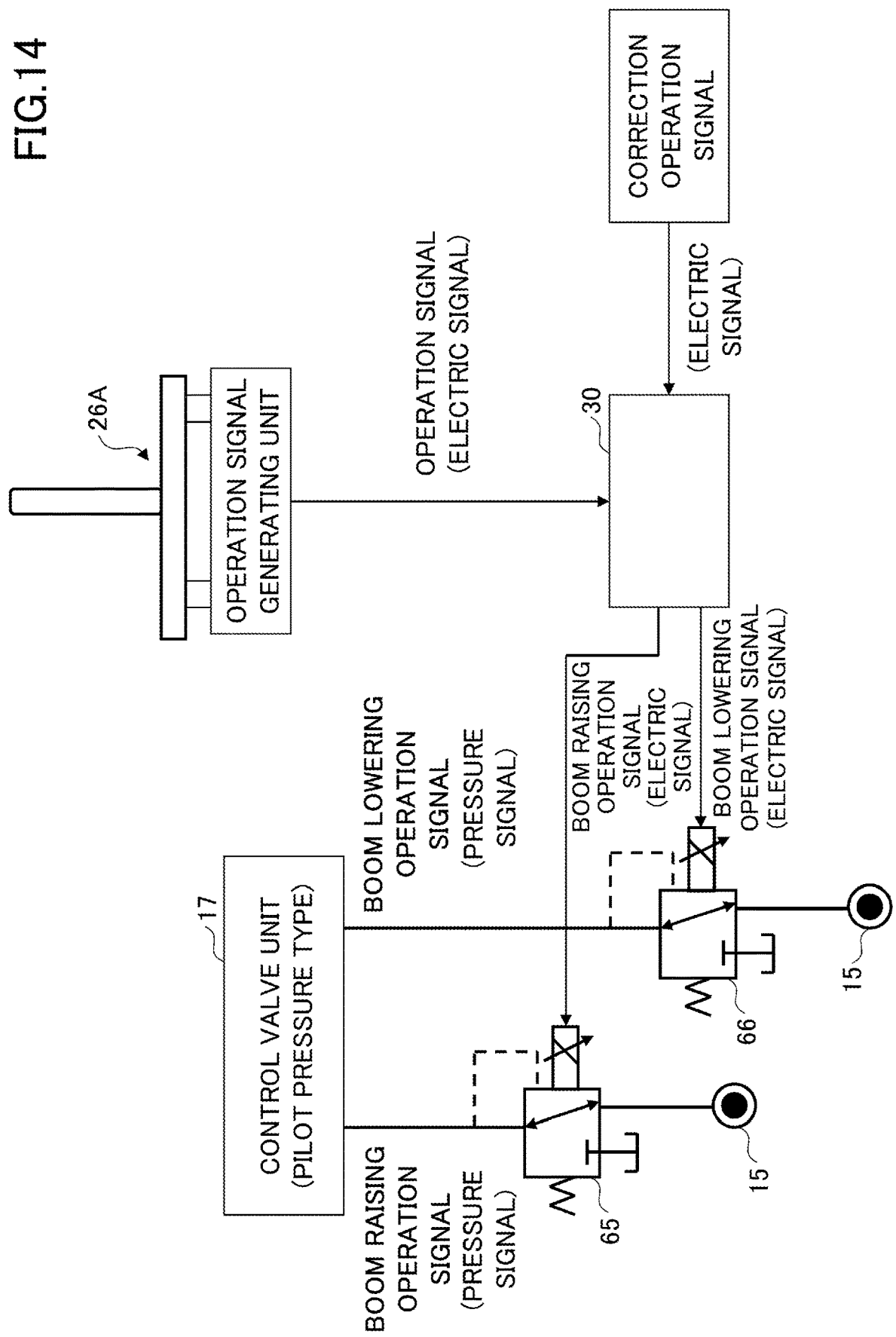
FIG. 14 is a drawing illustrating an example of configuration of an electric operation system.

Next, the electric operation system including the electric operation lever is explained with reference to FIG. 14. In a case where the electric operation system including the electric operation lever is employed, the controller 30 can execute the autonomous control function more easily than in a case where the hydraulic operation system including the hydraulic operation lever described above is employed. FIG. 14 illustrates an example of configuration of an electric operation system. Specifically, the electric operation system of FIG. 14 is an example of the boom operation system, and is mainly constituted by the control valve unit 17 of a pilot pressure-activated type, a boom operation lever 26A serving as an electric operation lever, the controller 30, an electromagnetic valve 65 for boom raising operation, and an electromagnetic valve 66 for boom lowering operation. The electric operation system of FIG. 14 can be applied to the arm operation system, the bucket operation system, and the like in a similar manner.

The control valve unit 17 of the pilot pressure-activated type includes a control valve 175 (see FIG. 4B) related to the boom cylinder 7, a control valve 176 (see FIG. 4A) related to the arm cylinder 8, and a control valve 174 (FIG. 4C) related to the bucket cylinder 9, and the like. The electromagnetic valve 65 is configured to adjust the size of area of the flow path of the conduit connecting the pilot pump 15 and the raising pilot port of the control valve 175. The electromagnetic valve 66 is configured to adjust the size of area of the flow path of the conduit connecting the pilot pump 15 and the lowering pilot port of the control valve 175.

In a case where a manual operation is performed, the controller 30 generates a boom raising operation signal (an electric signal) or a boom lowering operation signal (an electric signal) in accordance with an operation signal (an electric signal) that is output by the operation signal generating unit of the boom operation lever 26A. The operation signal that is output from the operation signal generating unit of the boom operation lever 26A is an electric signal that changes according to the operation amount and the operation direction of the boom operation lever 26A.

Specifically, in a case where the boom operation lever 26A is operated in the boom raising direction, the controller 30 outputs a boom raising operation signal (an electric signal) according to the lever operation amount to the electromagnetic valve 65. The electromagnetic valve 65 is configured to adjust the size of area of the flow path according to the boom raising operation signal (the electric signal), and controls a pilot pressure, as a boom raising operation signal (a pressure signal), that is applied to the raising pilot port of the control valve 175. Likewise, in a case where boom operation lever 26A is operated in the boom lowering direction, the controller 30 outputs a boom lowering operation signal (an electric signal) according to the lever operation amount to the electromagnetic valve 66. The electromagnetic valve 66 is configured to adjust the size of area of the flow path according to the boom lowering operation signal (the electric signal), and controls a pilot pressure, as a boom lowering operation signal (a pressure signal), that is applied to the lowering pilot port of the control valve 175.

In a case where the autonomous control is executed, for example, the controller 30 generates a boom raising operation signal (an electric signal) or a boom lowering operation signal (an electric signal) according to a correction operation signal (an electric signal), instead of the operation signal (the electric signal) that is output by the operation signal generating unit of the boom operation lever 26A. The correction operation signal may be an electric signal controlled by the controller 30, and may be an electric signal generated by an external control device and the like other than the controller 30.

Figure 15:
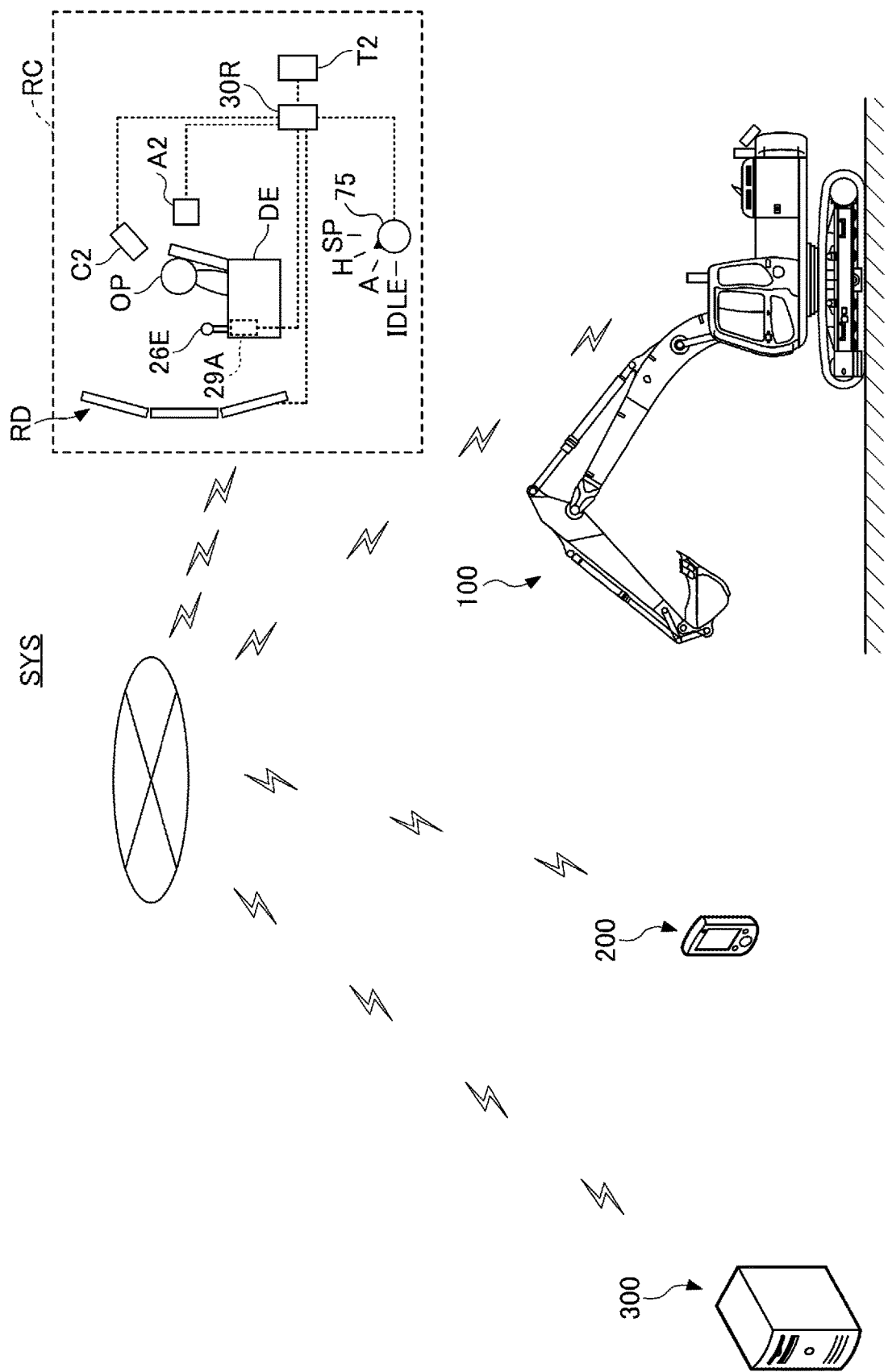
FIG. 15 is a schematic diagram illustrating an example of a construction system.

Next, the construction system SYS is explained with reference to FIG. 15. FIG. 15 is a schematic view illustrating an example of the construction system SYS. As illustrated in FIG. 15, the construction system SYS includes a shovel 100, an assistance apparatus 200, and a management apparatus 300. The construction system SYS is configured to support construction by one or more shovels 100.

Information obtained by the shovel 100 may be shared with managers, operators of other shovels, and the like, through the construction system SYS. The construction system SYS may be constituted by one or more shovels 100, one or more assistance apparatuses 200, and one or more management apparatuses 300. In this example, the construction system SYS includes a single shovel 100, a single assistance apparatus 200, and a single management apparatus 300.

The assistance apparatus 200 is typically a portable terminal device, and is, for example, a laptop-type computer terminal, a tablet terminal, a smartphone, or the like that is carried by workers at the construction site. The assistance apparatus 200 may be a portable terminal carried by the operator of the shovel 100. The assistance apparatus 200 may be a fixed terminal device.

The management apparatus 300 is typically a fixed terminal apparatus, for example, a server computer (what is termed as a cloud server) provided in a management center or the like outside the construction site. The management apparatus 300 may be, for example, an edge server provided at a construction site. The management apparatus 300 may also be a portable terminal apparatus (e.g., a portable terminal such as a laptop computer terminal, a tablet terminal, a smartphone, or the like).

At least one of the assistance apparatus 200 and the management apparatus 300 may include a monitor and a remote operation apparatus. In this case, an operator who uses the assistance apparatus 200 or a manager who uses the management apparatus 300 may operate the shovel 100 while using the remote operation apparatus. The remote operation apparatus is communicatively connected to the controller 30 provided in the shovel 100, for example, via a wireless communication network, such as a near field wireless communication network, a cellular telephone communication network, or a satellite communication network.

Various kinds of information displayed on the display device D1 disposed in the cab 10 (for example, image information representing the surroundings of the shovel 100, various setting screens, or the like) may be displayed by a display device connected to at least one of the assistance apparatus 200 and the management apparatus 300. Image information representing the surroundings of the shovel 100 may be generated based on the image captured by an image-capturing device (for example, a camera serving as the spatial recognition device 70). Accordingly, a worker who uses the assistance apparatus 200 or the manager who uses the management apparatus 300 may remotely control the shovel 100 or make various settings related to the shovel 100 while checking the surrounding condition of the shovel 100.

For example, in the construction system SYS, the controller 30 of the shovel 100 may transmit, to at least one of the assistance apparatus 200 and the management apparatus 300, information about at least one of: the time and location when the switch NS is depressed; the target trajectory used to move when the shovel 100 is caused to move autonomously; and the trajectory actually traced by the predetermined portion during autonomous movement. At this time, the controller 30 may transmit the image captured by the image-capturing device to at least one of the assistance apparatus 200 and the management apparatus 300. The captured image may be a plurality of images captured during autonomous movement. Further, the controller 30 may transmit, to at least one of the assistance apparatus 200 and the management apparatus 300, information about at least one of: data related to the movement content of the shovel 100 during autonomous movement, data related to the orientation of the shovel 100, and data related to the orientation of the excavation attachment. Thus, a worker who uses the assistance apparatus 200 or the manager who uses the management apparatus 300 can obtain information about the shovel 100 during autonomous movement.

As described above, with the construction system SYS, an operator of the shovel 100 can share information about the shovel 100 with a manager, operators of other shovels, and the like.

As illustrated in FIG. 15, the communication device provided in the shovel 100 may be configured to transmit and receive information to and from a communication device T2 provided in a remote operation room RC via a wireless communication. In the example illustrated in FIG. 15, the communication device provided in the shovel 100 and the communication device T2 are configured to send and receive information via the fifth generation mobile communication network (5G network), LTE network, satellite network, or the like.

A remote controller 30R, a sound output device A2, an indoor image-capturing device C2, a display device RD, a communication device T2, and the like are installed in the remote operation room RC. A driver's seat DE on which the operator OP remotely operating the shovel 100 sits is provided in the remote operation room RC.

The remote controller 30R is an arithmetic processing unit executing various kinds of calculations. In the present embodiment, similar to the controller 30, the remote controller 30R is constituted by a microcomputer including a CPU and a memory. Also, various functions of the remote controller 30R are achieved by the CPU executing a program stored in the memory.

The sound output device A2 is configured to output sound. In the present embodiment, the sound output device A2 is a speaker and is configured to reproduce the sound collected by the sound collecting device (not illustrated) attached to the shovel 100.

The indoor image-capturing device C2 is configured to capture images in the remote operation room RC. In the present embodiment, the indoor image-capturing device C2 is a camera provided in the remote operation room RC and configured to capture an image of the operator OP who sits on the driver's seat DE.

The communication device T2 is configured to control wireless communication with the communication device attached to the shovel 100.

In the present embodiment, the driver's seat DE includes a structure similar to the driver's seat provided in the cab 10 of a conventional shovel. Specifically, a left console box is provided on the left side of the driver's seat DE, and a right console box is provided on the right side of driver's seat DE. In addition, the left operation lever is provided at the front edge of the upper surface of the left console box, and the right operation lever is provided at the front edge of the upper surface of the right console box. In addition, a traveling lever and a traveling pedal are provided in front of the driver's seat DE. Furthermore, a dial 75 is located in the center of the upper surface of the right console box. Each of the left operation lever, the right operation lever, the traveling lever, and the traveling pedal constitutes an operation apparatus 26E.

The dial 75 is a dial for adjusting the number of revolutions of the engine 11, and is configured to switch, for example, the number of revolutions of the engine 11 in four steps.

Specifically, the dial 75 is configured to switch the number of revolutions of the engine 11 in four steps, i.e., an SP mode, an H mode, an A mode, and an idling mode. The dial 75 transmits data related to the setting of number of revolutions of the engine 11 to controller 30.

The SP mode is a mode for the number of revolutions that is selected when the operator OP wants to prioritize the amount of tasks, and uses the highest number of revolutions of the engine 11. The H mode is a mode for the number of revolutions that is selected when the operator OP wants to achieve both of the amount of tasks and the fuel consumption, and uses the second highest number of revolutions of the engine 11. The A mode is a mode for the number of revolutions that is selected when the operator OP wants to operate the shovel with low noise while giving priority to fuel consumption, and uses the third highest engine number of revolutions. The idling mode is a mode for the number of revolutions mode that is selected when the operator OP wants to run the engine at idle speed, and uses the lowest engine number of revolutions. The engine 11 is controlled to run at the number of revolutions in the engine speed mode selected with the dial 75.

In the operation apparatus 26E, an operation sensor 29A for detecting the movement content of the operation apparatus 26E is provided. For example, the operation sensor 29A is an inclination sensor configured to detect the tilt angle of the operation lever, an angular sensor configured to detect the swing angle around the swing axis of the operation lever, or the like. The operation sensor 29A may be constituted by other sensors such as a pressure sensor, an electric current sensor, a voltage sensor, a distance sensor, or the like. The operation sensor 29A outputs information about the detected movement content of the operation apparatus 26E to the remote controller 30R. The remote controller 30R generates an operation signal on the basis of the received information, and transmits the generated operation signal to the shovel 100. The operation sensor 29A may be configured to generate an operation signal. In this case, the operation sensor 29A may output an operation signal to the communication device T2 without going through the remote controller 30R.

The display device RD is configured to display information about the situation around the shovel 100. In the present embodiment, the display device RD is a multi-display consisting of nine monitors with 3 monitors arranged in the vertical direction and 3 monitors arranged in the horizontal direction, and is configured to display the situation of the space on the front, left, and right sides of the shovel 100. Each monitor is a liquid crystal monitor or an organic EL monitor. However, the display device RD may be constituted by a single or multiple curved monitors, or may be constituted by a projector. Also, the display device RD may be configured to display the situation of the space in the front, left, right, and rear sides of the shovel 100.

The display device RD may be a display device that can be worn by the operator OP. For example, the display device RD is a head-mounted display, and may be configured to send and receive information to and from the remote controller 30R by wireless communication. The head-mounted display may have a wired connection to the remote controller 30R. The head-mounted display may be a transmissive head-mounted display or a non-transmissive head-mounted display. The head-mounted display may be a monocular head-mounted display or a binocular head-mounted display.

The display device RD is configured to display an image so as to allow the operator OP in the remote operation room RC to see the surroundings of the shovel 100. Specifically, the display device RD displays an image so that the operator can see the surroundings of the shovel 100 as if the operator were in the cab 10 of the shovel 100 even though the operator is actually in the remote operation room RC.

Figure 16:
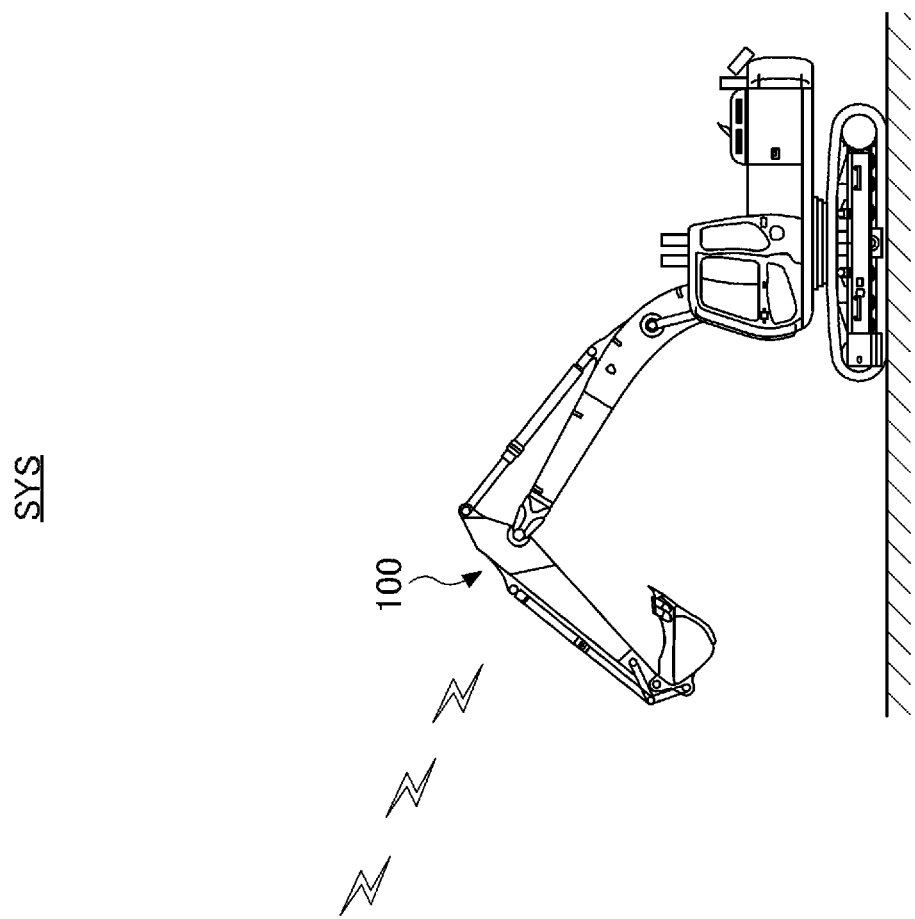
FIG. 16 is a schematic diagram illustrating another example of a construction system.

Next, another example of configuration of the construction system SYS is explained with reference to FIG. 16. In the example as illustrated in FIG. 16, the construction system SYS is configured to assist the construction by the shovel 100. Specifically, the construction system SYS includes a communication device CD communicating with the shovel 100 and a control device CTR. In the example as illustrated in FIG. 16, the communication device CD and the control device CTR are provided in the outside of the shovel 100. Then, the control device CTR is configured to assist the operator of the shovel 100 so that the level difference between two adjacent finished surfaces becomes equal to or less than the predetermined value when the shovel 100 performs the finishing task of the sloped surface. For example, the control device CTR may be configured to autonomously extend or retract the hydraulic cylinder so that the level difference becomes equal to or less than the predetermined value.

Alternatively, the control device CTR may be configured to move the predetermined portion of the attachment along the target trajectory configured on the basis of the designed surface, and configured to, in a case where the level difference is more than the predetermined value, adjust the height of the target trajectory. Alternatively, the control device CTR may be configured to display information about the level difference. Furthermore, the control device CTR may be configured to output a warning in a case where the level difference is more than the predetermined value.

Alternatively, the control device CTR may be configured to, in a case where the distance between two sloped surface portions of which the finishing has been completed and which are arranged on both sides of the sloped surface portion of which the finishing has not been completed is less than the predetermined value, calculate the difference between the height of the finished surface of one of the sloped surface portions and the height of the finished surface of the other of the sloped surface portions.

Alternatively, the control device CTR may be configured to calculate the magnitude of the level difference between two adjacent finished surfaces. In this case, the control device CTR may be configured to control the attachment so that the level difference becomes equal to or less than the predetermined value.

As described above, the shovel 100 according to the embodiment of the invention of the present application includes the lower traveling body 1, the upper turning body 3 turnably mounted on the lower traveling body 1, the attachment attached to the upper turning body 3, and the attachment actuator configured to move the attachment. The shovel 100 is configured to assist the operator so that the level difference between two adjacent finished surfaces is equal to or less than the predetermined value.

Specifically, for example, as illustrated in FIG. 8, the shovel 100 is configured to assist the operator by autonomously moving the excavation attachment AT so that the magnitude HT1 of the level difference LD1 formed between the surface of the strip-shaped area SW1 and the surface of the strip-shaped area SW0, i.e., two adjacent finished surfaces, becomes equal to or less than the predetermined value TH1.

According to this configuration, the shovel 100 can reduce the level difference between the two adjacent strip-shaped areas. Therefore, the shovel 100 can achieve a continuous finished surface. The shovel 100 is required to less frequently perform an excessive task for solving a relatively large level difference, and the efficiency of the task can be improved.

Even when the level difference of the sloped surface is within the allowable error range in design, problems may occur, for example, a concrete block may lift up when the concrete block is placed on the sloped surface. However, the shovel 100 can reduce the magnitude of the level difference, and therefore, occurrences of problems related to the level difference can be inhibited or prevented.

Even if the operator notices that there occurs a relatively large level difference between the two adjacent strip-shaped areas as a result of performing the finishing task with manual operation, the operator may leave the level difference without doing the finishing task again, if the level difference is within the allowable error range. In this case, the problems as described above may occur. In contrast, the shovel 100 autonomously changes the target trajectory of the excavation attachment AT so that the level difference does not become more than the predetermined value TH1, and therefore, the problems as described above can be reliably prevented from ultimately occurring.

Preferably, the shovel 100 is configured to calculate the magnitude of the level difference every time the attachment is brought into contact with the ground. According to this configuration, the shovel 100 can continuously inhibit the level difference between the two adjacent strip-shaped areas from becoming relatively large.

Preferably, the shovel 100 is configured to move the predetermined portion of the attachment along the target trajectory that is set on the basis of the designed surface, and configured to, in a case where the level difference between the two adjacent strip-shaped areas is more than the predetermined value, adjust the height of the target trajectory. According to this configuration, the shovel 100 can reduce the level difference between the two adjacent strip-shaped areas without requiring the operator to perform a special operation.

As an example of processing for assisting the operator so that the level difference between two adjacent finished surfaces becomes equal to or less than the predetermined value, the shovel 100 may be configured to display information about the level difference between the two adjacent strip-shaped areas. For example, when the finishing task is performed, the shovel 100 may be configured to display the first assistance screen as illustrated in FIG. 8 or the second assistance screen as illustrated in FIG. 11 on the display unit of the display device D1. According to this configuration, the shovel 100 can let the operator recognize, in advance, the state of the sloped surface achieved by the autonomous control.

The shovel 100 may be configured to, in a case where the distance between two sloped surface portions of which the finishing has been completed and which are arranged on both sides of the sloped surface portion of which the finishing has not been completed is less than the predetermined value, calculate the difference between the height of the finished surface of one of the sloped surface portions and the height of the finished surface of the other of the sloped surface portions. For example, as illustrated in FIG. 9, the shovel 100 is configured to, in a case where the distance DT between the sloped surface portion SF1 and the sloped surface portion SF2 of which the finishing has been completed and which are arranged on both sides of the sloped surface portion SN1 of which the finishing has not been completed becomes less than the predetermined distance TH2, calculate the size HTb of the level difference LDb that could be formed by the connection portion LK, i.e., the difference between the height of the strip-shaped area SW1 of the sloped surface portion SF1 and the height of the strip-shaped area SW21 of the sloped surface portion SF2. This is to effectively execute the function for reducing the level difference LDb that could be formed by the connection 10 portion LK when the sloped surface portion SF1 and the sloped surface portion SF2 are connected in the future.

The shovel 100 may autonomously move the actuator so that three or more consecutive finished surfaces rise higher in a stepwise manner or descend in a stepwise manner. For example, as illustrated in FIG. 11, the shovel 100 may autonomously move the actuator so that the difference between the surface of each of the strip-shaped areas SW1, SW0, SW10, SW11, and SW12 and the designed surface decreases in a stepwise manner in the order of DS1, DS0, DS10, DS11, and DS12. This is to prevent any one of the level differences LD1, LD10, LD11, LD12, and LDb from becoming particularly larger.

At least one of the two adjacent finished surfaces may be partially incomplete. For example, the shovel 100 may be configured to, at a point in time when both of the two adjacent finished surfaces are partially incomplete, estimate the magnitude of the level difference between these two adjacent finished surfaces and to adjust the height of the target trajectory according to the estimated size. According to this configuration, the shovel 100 can flexibly determine the state of the sloped surface that is achieved by the autonomous control.

For example, the two adjacent finished surfaces may be portions of a sloped surface, or may be portions of a surface of the foundation on which a pavement material is to be laid. According to this configuration, the shovel 100 can reduce the level difference between multiple strip-shaped areas constituting the sloped surfaces or the foundations.

The shovel 100 may output a warning in a case where the level difference between the two adjacent strip-shaped areas is more than the predetermined value. According to this configuration, the shovel 100 can notify the operator that the target trajectory is adjusted in order to reduce the level difference. In this case, by performing the predetermined operation, the operator may prohibit the adjustment of the target trajectory.

The shovel 100 can autonomously extend or retract the hydraulic cylinder, i.e., an example of the attachment actuator, so that the level difference between two adjacent finished surfaces becomes equal to or less than the predetermined value. For example, the hydraulic cylinder includes the boom cylinder 7, the arm cylinder 8, and the bucket cylinder 9. According to this configuration, the shovel 100 can reduce the magnitude of the level difference in a simple and easy manner.

The shovel 100 may be configured to output a sound according to the size of the distance between the predetermined portion of the attachment and target trajectory. For example, the shovel 100 may use a machine guidance function to output, through the audio output device D2, an intermittent sound according to the size of the distance (the vertical distance or the shortest distance) between the back surface of the sloped surface bucket 6S and the target trajectory. This is to let the operator of the shovel 100 audibly recognize the size of the distance between the back surface of the sloped surface bucket 6S and the target trajectory. Specifically, the shovel 100 may notify the operator that the back surface of the sloped surface bucket 6S is approaching the target trajectory by reducing the interval of the output of the intermittent sound in accordance with a decrease in the distance.

According to the above embodiment, a shovel capable of reducing the level difference between two adjacent strip-shaped areas is provided.

Although an example of the present invention has been described above in detail, the present invention is not limited to the particulars of the described embodiment. Various modifications or substitutions can be applied to the above-mentioned embodiment without departing from the subject matter described in the claims of the present application. Also, the features described separately in the above embodiment can be combined as long as there is no technical contradiction.

For example, in the above-described embodiment, the finishing task is a task for moving the sloped surface bucket 6S from the bottom FS of the sloped surface to the top TS of the sloped surface along the designed surface, but the finishing task may be a task for moving the sloped surface bucket 6S from the top TS of the sloped surface to the bottom FS of the sloped surface along the designed surface.

The invention claimed is:

1. A shovel comprising:
a lower traveling body;
an upper turning body turnably mounted on the lower traveling body;
an attachment attached to the upper turning body;
an attachment actuator configured to move the attachment; and
processing circuitry configured to control the shovel to autonomously operate such that a level difference between two adjacent finished surfaces becomes equal to or less than a predetermined value, the two adjacent finished surfaces being a surface of an area already formed by a finishing task and a surface of an area to be formed by a current or future finishing task.

2. The shovel according to claim 1, wherein the processing circuitry is configured to move a predetermined portion of the attachment along a target trajectory that is set based on a designed surface, and to adjust a height of the target trajectory when the level difference is more than the predetermined value.

3. The shovel according to claim 1, wherein the processing circuitry is configured to cause an actuator to autonomously move so as to form three or more consecutive finished surfaces of increasing or decreasing height in a stepwise manner.

4. The shovel according to claim 1, wherein the processing circuitry is configured to control the shovel to autonomously operate such that the level difference between the two adjacent finished surfaces becomes equal to or less than the predetermined value, the two adjacent finished surfaces being portions of a sloped surface or portions of a surface of a foundation on which a pavement material is to be laid.

5. The shovel according to claim 1, wherein
the attachment actuator includes a hydraulic cylinder, and the processing circuitry is configured to cause the hydraulic cylinder to autonomously extend or retract so that the level difference becomes equal to or less than the predetermined value.

6. The shovel according to claim 1, wherein the processing circuitry is configured to control the attachment so that the level difference becomes equal to or less than the predetermined value.

7. The shovel according to claim 1, wherein the processing circuitry is configured to control the shovel to autonomously operate such that the level difference between the two adjacent finished surfaces becomes equal to or less than the predetermined value that is less than an allowable error.

8. The shovel according to claim 1, wherein the processing circuitry is configured to calculate a magnitude of the level difference between the two adjacent finished surfaces and control the shovel to autonomously operate based on the calculated magnitude of the level difference.

9. The shovel according to claim 1, wherein the processing circuitry is configured to calculate a magnitude of the level difference between the two adjacent finished surfaces based on a difference in height between the surface of the area already formed and a designed surface and control the shovel to autonomously operate based on the calculated magnitude of the level difference.

10. The shovel according to claim 1, wherein the processing circuitry is configured to control the shovel to autonomously operate such that the level difference between the two adjacent finished surfaces becomes equal to or less than the predetermined value, the two adjacent finished surfaces including a finished surface formed with a height different from a height of a designed surface.

11. The shovel according to claim 1, wherein the processing circuitry is configured to control the shovel to autonomously operate such that the level difference between the two adjacent finished surfaces becomes equal to or less than the predetermined value, the two adjacent finished surfaces including a finished surface formed at a position higher than a designed surface.

12. A shovel comprising:
a lower traveling body;
an upper turning body turnably mounted on the lower traveling body;
an attachment attached to the upper turning body;
an attachment actuator configured to move the attachment; and
processing circuitry configured to control the shovel to autonomously operate such that a level difference between two adjacent finished surfaces becomes equal to or less than a predetermined value,
wherein the processing circuitry is configured to, in response to determining that a distance between two finished surface portions arranged across an unfinished sloped surface portion from each other is less than the predetermined value, calculate a difference between a height of a finished surface of one of the two sloped surface portions and a height of a finished surface of the other of the two sloped surface portions.

13. A shovel comprising:
a lower traveling body;
an upper turning body turnably mounted on the lower traveling body;
an attachment attached to the upper turning body;
an attachment actuator configured to move the attachment; and
processing circuitry configured to calculate a magnitude of a level difference between two adjacent finished surfaces, the two adjacent finished surfaces being a surface of an area already formed by a finishing task and a surface of an area to be formed by a current or future finishing task, and control the attachment so that the level difference becomes equal to or less than a predetermined value.

14. The shovel according to claim 13, wherein the processing circuitry is further configured to output a warning in response to determining that the level difference is more than the predetermined value.

* * * * *